United States Patent [19]

Bostrom et al.

[11] Patent Number: 5,046,912
[45] Date of Patent: Sep. 10, 1991

[54] CAR DUMPER

[75] Inventors: John Bostrom, Glen Dale; Eugene A. Annis, Baltimore, both of Md.

[73] Assignee: Rail Engineering, Inc., Baltimore, Md.

[21] Appl. No.: 289,140

[22] Filed: Dec. 23, 1988

[51] Int. Cl.⁵ .......................................... B65G 67/48
[52] U.S. Cl. ................................... 414/358; 414/372; 414/766; 414/767; 414/778; 414/779
[58] Field of Search ............... 414/354, 357, 358, 359, 414/360, 362, 371, 372, 764, 766, 767, 778, 779, 781; 298/38

[56] References Cited

U.S. PATENT DOCUMENTS

| | | |
|---|---|---|
| 17,114 | 4/1857 | Pearce et al. . |
| 304,831 | 9/1884 | Leavitt . |
| 327,506 | 9/1885 | Wolcott . |
| 563,939 | 7/1896 | McBride et al. . |
| 568,369 | 9/1896 | Randolph . |
| 855,267 | 5/1907 | Tuttle . |
| 1,195,398 | 8/1916 | Micheson . |
| 1,380,745 | 6/1921 | Smith . |
| 1,412,030 | 4/1922 | Simpson et al. . |
| 1,426,027 | 8/1922 | Wood . |
| 1,432,487 | 10/1922 | Nester .............................. 298/38 X |
| 1,447,428 | 3/1923 | Ramsay . |
| 1,566,506 | 12/1925 | Reese et al. . |
| 1,579,927 | 4/1926 | Griess . |
| 1,604,029 | 10/1926 | Enard . |
| 1,686,420 | 10/1928 | Repko . |
| 1,768,847 | 7/1930 | Kidder . |
| 1,821,217 | 9/1931 | Heaton et al. . |
| 2,179,100 | 11/1939 | Ramsay . |
| 2,344,742 | 3/1944 | Shields et al. . |
| 2,552,186 | 5/1951 | Koehler et al. . |
| 2,575,869 | 11/1951 | Flowers . |
| 2,752,053 | 6/1956 | Schwartz et al. . |
| 3,232,459 | 2/1966 | Sabin . |
| 3,463,333 | 8/1969 | Bellinger et al. . |
| 3,760,961 | 9/1973 | Haditsch . |
| 3,777,914 | 12/1973 | Cheek et al. . |
| 3,811,580 | 5/1974 | Sheppard . |
| 4,124,126 | 11/1978 | Abraham ......................... 414/766 X |
| 4,432,688 | 2/1984 | Schmidt . |
| 4,444,539 | 4/1984 | Muhoray ............................. 414/360 |
| 4,531,877 | 7/1985 | Carroll ................................. 414/372 |
| 4,659,275 | 4/1987 | Goodwin ......................... 414/360 X |

FOREIGN PATENT DOCUMENTS

| | | |
|---|---|---|
| 1935925 | 2/1971 | Fed. Rep. of Germany ...... 414/766 |
| 1254005 | 1/1961 | France .................................. 414/360 |
| 106934 | 5/1917 | United Kingdom . |
| 264613 | 1/1927 | United Kingdom ................ 414/358 |
| 374643 | 6/1932 | United Kingdom . |
| 1168748 | 10/1969 | United Kingdom ................ 414/360 |

OTHER PUBLICATIONS

Railcar Dumping Systems, Heyl & Patterson, Brochure, 10 pages, undated.
Roura Hoppers, Roura Iron Works, Inc., Brochure, 6 pages, printed 11/15/84.

*Primary Examiner*—David A. Bucci
*Assistant Examiner*—Robert S. Katz
*Attorney, Agent, or Firm*—Pollock, Vande Sande & Priddy

[57] ABSTRACT

Apparatus for receiving and dumping a top-unloading car. Cradle track extends from a car receiving position to a car dumping position, and is inclined downwardly from the car-receiving position. A car-receiving cradle assembly movably mounted on the cradle track includes rocker members with arcuate peripheries for contact with and support by the cradle track. Car rails support a loaded car on the cradle assembly with the combined center of gravity of the car, of its load and of the cradle assembly being located relative to the peripheries of the rocker members such that the cradle assembly, with a loaded car thereon, can roll by gravity action from a normal vertical position at the car-receiving position through an angle in the range of about 70 to about 110 degrees and, with an emptied car thereon, can roll by gravity action from the car-dumping position to return to a position within that range. Through hydraulic cylinders connected with the cradle assembly, liquid is applied under pressure for moving the cradle from a position in the above-indicated range to car-dumping position and for moving the cradle from a position in the above-indicated range to car-receiving position.

31 Claims, 7 Drawing Sheets

CAR DUMPER

TECHNICAL FIELD

The present invention relates to apparatus for at least partially inverting top-unloading railcars for unloading them. More particularly the invention relates to apparatus for inverting such cars by rolling them in a cradle which rolls on arcuate rocker members along a cradle track that extends laterally relative to the longitudinal axis of the cradle.

BACKGROUND

It has been suggested, for example in U.S. Pat. No. 17,114 to Pearce et al, dated Apr. 21, 1857; U.K. Patent 106,394 to Pattison, dated May 24, 1917; and U.S. Pat. No. 2,179,100 to Ramsay, dated Nov. 7, 1939, that railcars be unloaded by rolling them in a cradle which rolls on a cradle track. The track extends laterally relative to the longitudinal axes of the car and cradle, thus causing lateral translation of the car axis as the car rotates about that axis. The apparatus required to power and control the rotary-lateral motion in such dumpers has proved unsatisfactory in the past for a number of reasons, not the least of which have been cumbersomeness and slowness in operation. This no doubt is one of the reasons why these dumpers have not fared better in competition with the common rotary tipple type dumpers exemplified by U.S. Pat. Nos. 2,552,186 to Koehler, et al, dated May 8, 1951; 2,575,869 to Flowers, dated Nov. 20, 1951; and 3,811,580 to Sheppard, dated May 21, 1974.

More recent types of rotary-lateral dumpers which we refer to as gravity-only dumpers seek to preempt the above-described problems of rotary-lateral dumpers by shaping the profile of the arcuate cradle track-engaging rocker members in a special way. For example, see U.S. Pat. No. 4,432,688 to Schmidt, dated Feb. 21, 1984, in which the rocker profile conforms to an equation such that the profile will cause the cradle and car, when released, to pass along the cradle track from car-receiving position to car-dumping position and back again solely through the action of gravity, the return motion being assisted by the change in center of gravity of the car which occurs on discharge of its contents and by counterweights lifted during the dumping action. In other words, no external power source is used. Gravity only dumpers operate very rapidly and are quite simple, but are subject to a variety of disadvantages relating in general to proper control and completion of the dumping operation.

We believe however that there is a need for further improvements in rotary-lateral dumpers which provide for controlled motion of the cradle and car with good operating speed, while avoiding the complexity and cumbersomeness which have heretofore impeded wide acceptance of dumpers of this general category. The purpose of the present invention is to fulfill this need.

SUMMARY OF THE INVENTION

Among the inventions disclosed herein is apparatus for dumping top-unloading railcars which comprises a car-receiving cradle, rollable between a generally upright starting position for receiving a loaded car and a dumping position in which the cradle has been sufficiently inverted for dumping the contents of a car carried therein. The cradle has a car receiving portion, a center of gravity, including the mass of any loaded car in said car-receiving portion, and a longitudinal axis.

Also included in the cradle are rocker members with arcuate peripheries extending substantially in planes running transverse to said axis for supporting said cradle.

Driving pivot means connect with said rocker members for applying force to the rocker members in at least one position which is offset laterally from the side of the car receiving portion of the cradle, in the direction of the dumping position, as viewed in a transverse cross section of the cradle when it is in starting position. Cradle track runs laterally of said longitudinal axis beneath and supportively engaging said rocker members for rolling and lateral displacement of said cradle along said cradle track in a dumping motion which includes prior and subsequent portions.

The apparatus further includes at least one fluid actuated cylinder having a lower pivot and a support to which said pivot is connected, the lateral location of said support being intermediate the positions occupied by the cradle when in its starting and dumping positions, and said cylinder having a driving connection with said cradle through said driving pivot means.

In accordance with the invention, said lower pivot and driving pivot means are positioned for causing the cylinder to incline relative to the cradle track at an angle less than 90° and toward the cradle when the cradle is in starting position; to increase in inclination relative to the cradle track by pivoting about the lower pivot during rolling of the cradle along the cradle track during the prior portion of the dumping motion; to pass through a position which is at an angle of 90° with the cradle track and corresponds to a given rotational position of the cradle intermediate the starting and dumping positions; and to continue pivoting in the subsequent portion of the dumping motion until the cylinder is inclined relative to the cradle track at an angle less than 90° and toward the cradle when the latter reaches dumping position.

Another aspect of the apparatus of the present invention is similar in a number of respects to the combination just described. However, according to this aspect of the invention, the car-receiving cradle includes, in its car receiving portion, car rails for receiving a loaded car into the cradle at a predetermined elevation, and further includes clamping means for clamping the car against said car rails in said car-receiving portion of the cradle and holding the car in place substantially at said predetermined elevation during its dumping motion and inversion, throughout its presence in dumping position and during its return motion to starting position.

Moreover, in this second aspect of the invention the function performed by the positioning of the above mentioned lower pivot and driving pivot means is that of causing the cylinder to retract during a prior portion of the dumping motion during which the cradle rotates through an angular interval in the range of about 70 to about 110 degrees from its starting position; to cease retracting at a transitional position corresponding to a given rotational position of the cradle intermediate the starting and dumping positions thereof; and to thereafter extend in a subsequent portion of the dumping motion. The function of the positioning of the above mentioned lower pivot and driving pivot means also includes causing the cylinder, after dumping of the car, to retract during a prior portion of the return motion of the cradle toward its starting position; to cease retracting at said transitional position; and to extend in a subsequent portion of the return motion.

According to this second aspect, the condition of the cradle track with respect to its being inclined or not inclined from the horizontal and the position of the center of gravity of the cradle are preferably coordinated for causing rolling of the cradle to continue at least in part by gravity during at least the prior portion of its dumping motion, and during at least the prior portion of its return motion. In other respects the present apparatus is similar to the one previously described.

A third aspect of the invention is an apparatus for receiving and dumping top-unloading cars comprising a car-receiving cradle, rollable between a generally upright starting position for receiving a loaded car and a dumping position in which the cradle has been sufficiently inverted for dumping the contents of said car. This assembly includes a longitudinal axis, rocker members with arcuate peripheries and car rails mounted within said rocker members for supporting a loaded car on said cradle.

In this third aspect, the combined center of gravity of the car, of its load and of said cradle are located relative to the peripheries of said rocker members for causing said cradle, with a loaded car thereon, to lower its center of gravity while moving from said starting position in a prior portion of its dumping motion comprising an angular interval in the range of about 70 to about 110 degrees, to continue beyond said interval to said dumping position in a subsequent portion of its dumping motion and, with an emptied car thereon, to lower its center of gravity in a prior portion of its return motion from said dumping position and, while passing through said angular interval to said starting position, to elevate its center of gravity in a subsequent portion of said return motion.

Moreover, this third aspect includes cradle track running laterally of the cradle longitudinal axis beneath and in supportive engagement with the rocker members for rolling and lateral displacement of said cradle along said cradle track between said starting and car dumping positions. At least one fluid actuated cylinder is connected with said cradle to apply fluid under pressure for moving said cradle beyond said interval during its car-dumping motion and within said interval during its return motion.

A fourth aspect of the invention is similar to the foregoing aspects in that it relates to apparatus for receiving and dumping top-unloading railcars, comprises cradle track extending from a car receiving position to a car dumping position, and also includes clamping means for holding a car in place as it is inverted. However, this clamping means may be used in dumpers which do and do not include all of the features described in the preceding aspects.

According to this fourth aspect of the invention, a car-receiving cradle is movably mounted on the cradle track and includes car rails for supporting a loaded car on said cradle in a car receiving portion of the assembly. Rocker members included in the cradle have arcuate peripheries for contact with and support by said cradle track. These rocker members comprise a laterally projecting lower portion extending beneath said car-receiving portion, a first side portion that is generally vertical and extends upwardly alongside said car-receiving portion, an overhanging upper portion overhanging said car-receiving portion, and a second side portion which is open at least at or near car coupler height and is located on the opposite side of the car-receiving portion relative to said first side portion.

The rocker members comprise car clamping means for engaging upper portions of a car and clamping said car in said car-receiving portion of the cradle. Such clamping means include pivot means connected with and supported by said overhanging upper portions of said rocker members. The clamping means also include power means. The latter is connected with and supported by said pivot means for pivoting adjustment of the position of the clamping means toward and away from said first side portion and has a power transmitting member for extension and retraction toward and away from the car upper portion. A car clamping member is suspended from said power means for moving up and down in response to motion of said power transmitting member for clamping and unclamping the car.

At least one fluid actuated cylinder is connected with the cradle for assisting in movement of the cradle between its car-receiving and car dumping positions. This cradle movement includes a dumping motion having a prior portion in which the cradle rotates through an angular interval in the range of about 70 to about 110 degrees from the car-receiving position. The cylinder applies fluid under pressure for moving the cradle in a subsequent portion of the dumping motion beyond said interval. Also included in the cradle movement is a return motion in which the cylinder applies fluid under pressure for moving the cradle within the afore-mentioned interval toward the car-receiving position.

One or more of the following advantages inhere in the various embodiments of the invention, it being understood that not all embodiments of the invention will necessarily possess all of these advantages.

To be 100% efficient, railcar dumpers must dump the total load they contain so long as it is not frozen. Our dumper will dump the total contents of the railcar because we can cause the dumper to remain in the dump position as long as necessary. A gravity-only dumper has no control on how long the railcar remains in the dump position, consequently has no control over having the total load dumped.

Many times a railcar will arrive at the dumping site and be only partially full. Our dumper will dump partially full as well as totally full railcars because we cause our dumper to raise either load to the full dump position and we do not rely on gravity for this part of the dump cycle. Certain gravity-only dumpers can dump only railcars that are more than two-thirds full because their entire dump cycle is controlled by gravity and with less than two-thirds of a load, the center of gravity is out of position for properly completing the dumping motion.

In dumping railcars, it is important to provide separate and distinct speeds for different products. Lighter density products such as wood chips or grain will require a different speed of operation than a heavier product such as iron ore. Coal which has a lower density than iron ore will also dump better if the speed of operation is different from the two listed above. Our dumper readily adapts to providing remote control for the speed of operation through our electronically controlled hydraulic system. This speed can be set at the optimum for different type and density products. A gravity-only dumper has no speed control since it works totally by gravity; Strachan & Henshaw manufactures an electric constant speed dumper as does Heyl & Patterson.

Some variants of materials in the same family of products, such as lump coal and metallurgical (ground) coal have different flow characteristics. Lump coal will dump faster than powdery metallurgical coal and therefore it is necessary to vary the speed of the dump or the time required to empty the car. Our dumper may be controlled for any speed of dump required through our electronically controlled hydraulic system. A gravity-only dumper typically has no control on how long the dumper will remain in the dumping position because the system is totally actuated by gravity and does not stop except for the instant in which it changes direction at the dump position.

Our dumper can readily operate to a specific preset start position and to a specific preset dump position. The start position (also called the final stop position) can always be at the same place in order to properly align the car-receiving track of the dumper for discharge and receiving of railcars. The dump position can be remotely set or reset for the optimum dump position. The dump position will preferably be reached when the electronically controlled hydraulic system stops the extension of the hydraulic cylinders. The final stop position is softly reached by the action of the electronic controls for the hydraulic system. There is no banging to stop our dumper in the final stop position thus eliminating shock in the base and structure. A gravity-only dumper requires the total rolling mass (controlled by gravity) to be stopped at the final stop position by the structural frame.

It is critical that a rolling dumper always return to the same final stop or start position in order to prepare the dumping system to discharge and receive railcars. The use of hooks, clamps, latches, and the like to arrest the travel of the dumper cradle always presents the possibility of failure due to wear. Our dumper does not rely on hooks, clamps, or latches to "catch" the dumper cradle on its return stroke. Our system moves the dumper at a controlled rate of speed to the final stop or start position, such as by means of our electronically controlled hydraulic system. A gravity-only dumper such as that of Schmidt relies on hooks, clamps, latches, etc. to stop and hold the dumper cradle in the final stop or start position. Rotary dumpers, such as Heyl & Patterson 180° and 360° rotation dumpers, require some type of hook, clamp, latch, etc. to prevent drifting from the final stop or starting position either while at rest or while discharging or receiving railcars.

Many railcar dumpers have employed chains to cause rotation, cables to maintain position, or counterweights to assist in the dumper operation. For example, certain of Heyl & Patterson's units use chains to produce rotation of their dumper cradles. At least some of the gravity-only dumpers employ cables and counterweights to operate the unit. For example, Ramsay in U.S. Pat. No. 1,447,428, dated Mar. 6, 1923, taught use of counterweights. Shields et al in U.S. Pat. No. 2,344,742, dated Mar. 21, 1944, rely on cables to control the dump. Our dumper requires no chains, cables or counterweights to assist or to carry out the dump cycle.

There are many different products transported by top unloading railcars and some have very poor flow characteristics that require different angles of dump. Even a particular product such as sand, depending on its moisture content, may require adjustment of the discharge slope angle of the dumper for a total and proper dump. Our dumper discharge slope angle can be remotely changed, to suit the flow characteristics of the specific product to be dumped, through the electronically controlled hydraulic system. A gravity-only dumper discharge slope angle is typically fixed for each machine and cannot be conveniently changed.

In order to provide the safest piece of operating equipment possible, which will provide a safe work environment for the operators and maintenance personnel as well as for the equipment, it is necessary to have total control of all movements. Our dumper in the gravity actuated movement as well as the powered phase can if desired be under total control by the electronically controlled hydraulic system. The dumper motion can be interrupted, locked in position, and commenced again at any time in either the gravity actuated or powered phase with a loaded or unloaded car in place. A gravity-only dumper is totally gravity operated and cannot readily be stopped and restarted once the dumping cycle has been started.

It is very important that the holding or clamping means on the top of the railcar be designed to prevent damage to the top edges of the railcar. When the load dumps, the springs supporting the railcar and its load will try to extend. If the clamping means holds the railcar in a fixed position, damage can occur along its top edge. Our dumper employs a remotely controlled hydraulic system to apply a constant holding force on the top edge. It matters not that the railcar is half or totally full or even empty. Maintenance of constant holding force as the load is removed will allow the car to rise and yet hold it in place with unchanged clamping force in the dumper cradle. Haditsch and Cheek et al in U.S. Pat. Nos. 3,760,961 and 3,777,914 employ spring compensated clamps to accomplish this result; Heyl & Patterson in certain of their dumpers use a cable applied spring clamp; gravity-only dumpers typically use fixed clamps.

One of the primary requirements of any machine design is to eliminate as much maintenance as possible. One way to reduce maintenance is to reduce or eliminate moving or mating parts. Our dumper has fewer moving parts than most of the other railcar dumpers presently being manufactured and/or installed in this country. Rotary dumpers (180° and 360° rotating units) as manufactured, employ many rotating parts which over a period of time create high maintenance costs.

In order to reduce downtime and maintenance costs, it is vital to have easy access to all parts requiring repair or replacement. Our dumper is very simple, wide open, and offers easy access to all parts for maintenance. Rotary dumpers (180° and 360° rotating units) as installed today are very complicated and do not provide easy access to all parts requiring repair or replacement.

The requirement of any good machine design is to use "off the shelf" spare parts or spare parts that are commercially available without long delays waiting for deliveries. Because of the complicated nature of the 180° and 360° rotary dumpers, very few of these parts are "off the shelf" items.

In order to be a versatile piece of equipment, the railcar dumper must be capable of conveniently unloading open top railcars of substantially different sizes. Preferably, the dumper should handle tall hopper railcars (approximately 14'0" high) which transport wood chips, average height hopper railcars (approximately 10'8" high) which transport coal, and gondola railcars (approximately 8'7" high) which transport miscellaneous products. Our dumper can be readily adapted to handle all three of these types of railcars by simply extending the top hydraulic cylinders, which clamp the car in place, to the appropriate location. The height of the car is of little concern with respect to the dumping operation as the electronically controlled hydraulic system will operate with any of these railcars in place. A gravity-only dumper relies on gravity and a specific location of the center of gravity for proper operation. Thus, the gravity only dumpers presently available are designed for a specific car size and product and do not operate properly with cars of substantially different sizes because location of the center of gravity varies as the car size varies.

With today's energy crunch and the ever increasing need for more electricity it is important that all new and existing machines operate on as low a power requirement as possible. Our dumper uses only enough power to run medium size electric motors which power hydraulic pump units. Commercially available rotary dumper units manufactured by McDowell-Wellman and by Heyl & Patterson employ large electric motors to drive gear boxes which cause the dumpers to rotate. These motors require large amounts of electric power to operate the equipment.

To be as versatile as possible the dumper should be able to feed and discharge the car to and from the cradle by more than one method. Present methods include side loading/unloading, bottom (in track) loading/unloading, and cable and winch arrangements. Our dumper is suitable for use with all of these methods. We can move the railcar onto and off of the car rails of the dumper cradle with a powered vehicle which runs parallel to the car rails and which has an arm extending into contact with the car coupler; with an hydraulic or electric shuttle which runs below the car, between the car rails; or with a winch and cable arrangement. Only one of these three methods can be conveniently employed by the existing rotary and gravity-only dumpers, the bottom (in track) loading/unloading method.

Many dumping installations must constantly dump cars for extended periods of time because of the tremendous quantity of product to be handled. An ideal installation is one that has a stand-by dumper to be used when the normal dumper breaks down or requires maintenance. Our dumper, because of its potential for economical construction and installation, is ideally suited for this application. The product from our dumper can be dumped onto the ground or dumped into standby materials handling equipment to put the dumped material back into the system serviced by the regular dumper. Popular rotary dumpers currently in use can cost as much as five or more times as much as the dumpers of our invention, and these costs prohibit their use as stand-by equipment.

Versatility is the name of the game in today's market place and this also includes railcar dumpers. Our dumper can be used to dump its load onto the existing grade or into materials handling equipment for transporting the product into a processing system. Rotary dumpers will seldom be cost effective unless the application is so sophisticated as to require feeding their output into materials handling systems, and thus their cost of installation limits their versatility. The same applies to side lift dumpers.

One of the major costs of most dumper installations is in its foundations. Rotary dumpers, side lift dumpers and lift-type hydraulic dumpers typically require complicated massive foundations to support the dumper above the materials handling system or to resist huge moment loads. Our dumper employs simple low cost foundations because there is no requirement for high soil loadings nor for complicated cast-in-place concrete structures. We basically employ a flat slab with necessary piers to support the cradle rails.

Dumpers need to be installed where the dumping operation is required. This can only be accomplished if the foundation can be installed on relatively poor soil for this type of application. Light-weight embodiments of our dumper can be located on soil which has a bearing value as low as 2000 PSF. This is made possible by the fact that our dumper can readily be supported on a wide, low profile foundation. Rotary dumpers, side lift dumpers, and lift type hydraulic dumpers have their loads concentrated in such a small area that it would be impossible to locate most of them solely on 2000 PSF soil.

In order for any machine to have a low manufacturing cost and to operate successfully for long periods of time without maintenance or with very little maintenance, its design and operation must ordinarily be simple. The simpler, the better. Our dumper is a simple design, arranged to provide for long term, low maintenance operation. There are no complicated mechanisms or need for many forms of adjustment. Rotary dumpers, by the very nature of their design, are complicated, having many wheels, pillow blocks, special adjustable and automatic clamping devices, and numerous complicated moving parts.

One of the first questions asked by a prospective buyer of any product, is how much it costs. Our dumper, because of its simplicity, use of commercially available parts, low maintenance responsibilities, and ease of access to all areas, etc., provides one of the lowest cost manufactured railcar dumpers being sold today. Rotary dumpers, because of their complicated arrangements, difficult access areas for maintenance, and high cost of maintenance cause them to be among the highest priced dumpers commercially available today.

Normally railcar dumpers are not required to have short delivery cycles because they are part of a much larger installation and there is normally sufficient time for the order to be filled. Our dumper, for reasons listed above, is ideal for short term deliveries, thereby not tying up capital funds for extended periods of time. On the other hand, rotary dumpers typically have longer manufacturing and delivery cycles.

Other advantages of the invention will be evident to those skilled in the art upon acquiring experience in the construction and operation of its various embodiments.

This invention and further improvements thereon, the latter being both embodiments of the present invention and inventions in their own right, are illustrated and described in the accompanying drawings and in the text entitled "Various and Preferred Embodiments" which follows.

VARIOUS AND PREFERRED EMBODIMENTS

Figure 1:
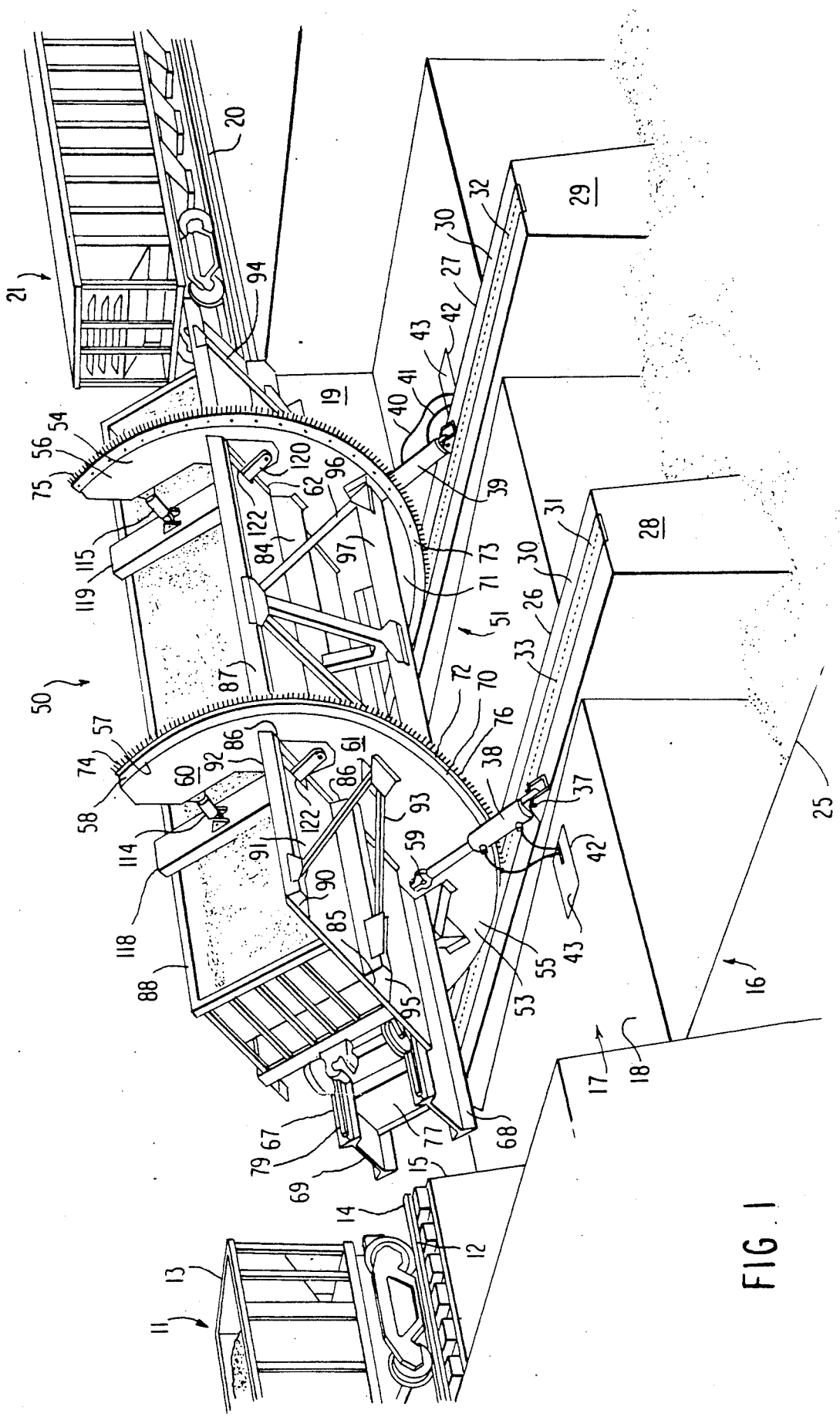
FIG. 1 is a perspective view of a car dumper in accordance with the invention, with the dumper rotated to a position intermediate its starting and dumping positions.

Each of the following features of the invention may be used singly or in any combination with the subject matter described above under "Summary of the Invention."

For example, it is anticipated that the primary application of the apparatus of the present invention will be in the dumping of cars loaded with coal. However, in the foregoing discussion of advantages under "Summary of the Invention", it has been pointed out how the controlled dumping characteristics of the invention move the car in a positive manner to a predetermined dumping position and afford an opportunity for a controlled dwell time in dumping position. Because of this, the invention is suitable for use with cars fully or partially loaded with a variety of materials other than coal, including for example, stone, iron ore, grain, wood chips, various chemicals, sand and the like.

The apparatus of the present invention can be applied to virtually any type of car which can be dumped by inversion, including for example open top hoppers and gondolas, as well as those covered cars whose covers can be removed prior to dumping or can open on inversion of the car. The relative positions of such openable covers and the clamping members of the car dumper should be established in an appropriate way to avoid undue mutual interference.

When the cradle of the car dumper is in starting position, the car rails supported in the cradle will normally be in alignment with a feeder track for receiving generally upright, loaded cars therefrom. The feeder track may also act as a discharge track, but it is preferred to provide a separate discharge track so that loaded cars may enter one end of the cradle and be discharged from the other end. Although not shown in the accompanying drawings, it will in many circumstances prove beneficial to utilize conventional car handling devices to move cars onto and off of the cradle, such as the side arm charger with coupler arm described in U.S. Pat. No. 3,811,580 to Sheppard, and certain embodiments of the invention include a cradle having rocker members with sides that are at least partially open to facilitate the use of such chargers.

In the most preferred embodiments of the invention, the arcs described by the arcuate peripheries of the rocker members substantially coincide with a true circle. However, in principle, there is no reason why the radii of such arcs may not vary and be profiled in such a manner as to facilitate or retard motion of the cradle during any desired portion of its operating cycle.

As indicated above, the dumping motion of the present apparatus includes prior and subsequent portions with specified operational characteristics. The dumping motion or cycle may include portions other than those specified without departing from the invention, and these other portions may occur before, after and/or between the specified prior and subsequent portions of the dumping motion.

According to a preferred embodiment, the prior portion of the dumping motion coincides with rotation of the cradle through a substantial portion of the entire rotation to which the cradle is subjected during the dumping motion. Still more preferably, such prior portion coincides with rotation of the cradle through at least about one fourth, more preferably at least about one third and still more preferably about one half of the entire rotation to which the cradle is subjected during the dumping motion. For certain particularly preferred embodiments of the invention, the prior portion of the dumping motion coincides with rotation of the cradle through at least about 70°, more preferably at least about 80°, and most preferably about 90° of rotation.

According to certain preferred embodiments, the dumping motion is commenced at least in part by the action of gravity. However, this gravity action may be supplemented by a power assist. Also, it is within the contemplated scope of the invention that the dumping motion be commenced not by the action of gravity but rather entirely under the influence of a power source acting without gravity assist or even against the action of gravity. However, those embodiments in which the dumping motion commences at least in part by the action of gravity are preferred.

The action of gravity can be applied in a variety of ways to commence the dumping motion. For example, the motion may be commenced at least in part by causing rolling of the cradle down a portion of the cradle track that is inclined down and away from the starting position. Preferably, such motion is commenced solely by rolling of the cradle down a portion of the cradle track that is inclined down and away from the starting position.

On the other hand, the action of gravity may be applied in such a way that the dumping motion is commenced at least in part by causing rolling of the cradle along an inclined or non-inclined portion of the cradle track by establishing the combined center of gravity of the cradle, car and load, in the starting position, at a sufficient elevation and lateral position, relative to a series of shifting locations at which the peripheries of the rocker members will contact the cradle track during rolling, for promoting rolling of said rocker members along the cradle track toward the dumping position. In a preferred embodiment, the foregoing establishment of the center of gravity is combined with commencing the dumping motion at least in part by rolling the cradle and rocker members along a portion of the cradle track that is inclined; and according to a still more preferred embodiment that inclined portion of the cradle track is inclined down and away from the starting position.

The technique by which the dumping motion is commenced and the technique by which the dumping motion is caused to continue through at least a major portion of its prior portion will not necessarily be the same. For example, the dumping motion may be commenced under power without gravity action and may continue for the remainder of the prior portion without power and solely under the influence of gravity. In the alternative, commencement of the dumping motion may both involve application of gravity and power while the remainder of the prior portion may include retardation of the dumping motion. Persons skilled in the art, with the benefit of the present disclosure, will readily devise alternative operational modes to fit the particular circumstances in which the invention is used.

However, irrespective of how the dumping motion is commenced, it is preferred to cause the cradle to roll along the cradle track through at least a major portion of the prior portion of the dumping motion, at least in part by the action of gravity, and this is still more preferably accomplished by causing the cradle to roll down a portion of the cradle track that is inclined down and away from the starting position. According to the most preferred embodiments, the cradle is caused to roll through the major portion of the prior portion of the dumping motion solely by rolling the cradle down a portion of the cradle track that is inclined in the above manner.

Alternatively, as in the case of commencement of the dumping motion, the cradle may be caused to roll through the aforesaid major portion at least in part by rolling the cradle along an inclined or non-inclined portion of the cradle track by establishing the combined center of gravity of the cradle, car and load, in the starting position, at a sufficient elevation and lateral position, relative to a series of shifting locations at which the peripheries of the rocker members will contact the cradle track during rolling, for promoting rolling of said rocker members along the cradle track toward the dumping position. Preferably, this is done in combination with causing the cradle to roll through said major portion along a portion of the track that is inclined, and particularly preferably along a portion of the cradle track that is inclined down and away from the starting position. However, in certain circumstances all or a portion of the cradle track may with advantage be inclined up and away from the starting position, such as when it is desired to dump the car contents at an elevation well above that of the feeder track.

In contrast with the prior art exemplified by the above-identified Schmidt patent, a preferred embodiment of the present invention includes causing rolling of the cradle to occur during the prior portion of the dumping motion while limiting the rotational velocity of the cradle to less than its free rolling velocity. According to a particularly preferred embodiment of the foregoing technique, the rotational velocity of the cradle is limited by a hydraulic cylinder which is operationally connected with the cradle and undergoes retraction during the prior portion of the dumping motion; the hydraulic cylinder includes a piston, and the flow of liquid from and/or to those portions of the cylinder which are respectively ahead of or behind the moving piston are throttled for limiting the rotational velocity of the cradle.

With or without such limiting of rotational velocity, it is preferred to cause the rolling of the cradle to occur in combination with retraction of a hydraulic cylinder including a piston during the prior portion of the dumping motion and to cause said rolling to continue at least in part by the action of gravity until the retraction movement of the piston has been completed and reversed to commence extension of the cylinder.

As in the case of the prior portion of the dumping motion, the subsequent portion thereof preferably coincides with rotation of the cradle through a substantial portion of the entire rotation to which is it subjected during the dumping motion. Such substantial portion preferably represents at least about one-fourth, still more preferably at least about one-third and most preferably about half or less of the entire rotation to which the cradle is subjected during the dumping motion. According to certain particularly preferred embodiments, the subsequent portion of the dumping motion coincides with rotation of the cradle through at least about 40°, more preferably at least about 50° and still more preferably about 40° to about 90° of rotation.

According to a particularly preferred embodiment the prior and subsequent portions of the dumping motion respectively include retraction and extension of a hydraulic cylinder including a piston and means for supplying and exhausting driving liquid to and from said cylinder. According to a preferred embodiment of the foregoing, there is transition from the prior portion to the subsequent portion of the dumping motion which transition substantially coincides with completion of the retraction movement of the piston. The condition of the cradle track with respect to its being inclined or not inclined from the horizontal and the position of the center of gravity of the cradle are preferably coordinated for causing rolling of the cradle to continue at least in part by gravity during a portion of the dumping motion including up to, through and beyond said transition. Thus, it is also preferred that the elevation of the combined center of gravity of the cradle and the loaded car, in the starting position, be at or above that of the rotational axis of the cradle, and that such center be displaced from the axis generally in the direction of the dumping position of the cradle. Then, if the above-described transition occurs when the cradle has rolled about 90 degrees from the starting position, the cradle center of gravity can provide driving force to at least assist in driving the cradle to and beyond the transition, if desired.

As indicated above under "Summary of the Invention", during the subsequent portion of the dumping motion, with the cradle and car rotated about 90 degrees or more from starting position, rolling of the cradle is continued at least in part by forcing fluid against a piston having a driving connection with said cradle for displacing the cradle and car laterally and driving said cradle towards the dumping position. Commencement of the forcing of fluid against the piston may substantially coincide with the above-identified transition, or may occur thereafter. If the shape of the rocker members, the inclination of the cradle track, the momentum of the cradle and/or the position of the center of gravity of the cradle, car and load are such that the cradle will continue to roll some distance past the transition point without application of power, the forcing of fluid against the piston may be deferred until after the transition, for example until the cradle will not roll further without application of power.

However, whether or not the transition coincides with completion of retraction and whether or not forcing of liquid is commenced at or after the transition as above described, there are additional species of the invention in which the prior and subsequent portions of the dumping motion respectively include retraction and extension of a hydraulic cylinder including a piston. Certain of these additional embodiments relate to positioning of the driving connection between the piston and the cradle. For example, the driving connection between the piston and the cradle, referred to herein as the driving pivot means, is preferably at least one driving pivot connected with at least one rocker member at a position which, as viewed in a transverse cross-section of the cradle, is offset toward the dumping position from a straight line including that side of the car-receiving portion of the cradle which is nearest the dumping position. Still more preferably, there is a driving piston for each rocker member, and the driving pivot means is a pair of driving pivots each connected with at least one rocker member at a position which is offset in the above-described manner.

Irrespective of which of the foregoing arrangements is employed, the elevation of the driving pivot means is preferably at or below that of the top of the car-receiving portion of the cradle, i.e. at or below the top edges of the car when the cradle is in starting position. Whether or not the elevation of the driving pivot means is below that of the top edges of the car, it is also preferably at or above that of the bottom of the car-receiving portion, i.e. at or above the bottoms of the car wheels when the cradle is in the starting position. However, the most preferred embodiment is one in which the elevation of the driving pivot means, in starting position, is intermediate the elevations of the bottom and top of the car-receiving portion of the cradle. The above-described hydraulic cylinder or cylinders may take a variety of forms, including single and double-acting cylinders. The most preferred cylinders for use in the present invention are those having a telescoping piston, and this type of cylinder is preferably used with any or all of the foregoing species of the invention.

It is particularly preferred that the rolling of the cradle be caused at least in part by forcing liquid against the piston of a hydraulic cylinder during at least a major portion of the subsequent portion of the dumping motion. Still more preferably, such rolling is caused at least in part by forcing said liquid against said piston during substantially all of the subsequent portion of the dumping motion.

According to another preferred aspect of the invention, liquid is forced against the piston during at least a major portion of the subsequent portion of the dumping motion for causing rolling of the cradle to continue to the dumping position and for sufficiently inverting the car by rotation for dumping the load. According to a preferred optional form of the above embodiment, rolling of the cradle is caused during the subsequent portion of the dumping motion by application of gravity through inclination of the cradle track downwardly and outwardly toward the dumping position and by forcing said liquid against said piston throughout substantially the entire subsequent portion of the dumping motion.

Regardless of the extent to which rolling of the cradle is caused by liquid force during the subsequent portion of the dumping motion, it is preferred that the dumping motion be completed by stopping the flow of liquid to a hydraulic cylinder including a piston, and preferably by immobilizing the liquid within the cylinder.

According to the invention, without regard to whether flow stoppage of hydraulic liquid is or is not used to complete the dumping motion, the car is preferably maintained stationary in dumping position between the dumping and return motions for a pre-determined period of time. An appropriate time interval will readily be determined without undue experimentation through observation of the dumping characteristics of the material which is being unloaded. Dry, unfrozen coal generally flows from an open top hopper car very rapidly so that the predetermined time may be very short or even eliminated altogether. On the other hand, such products as wood chips, especially when in a damp condition, will usually flow less readily so that a longer predetermined period of dwell between the dumping and return motions may prove useful.

The total arcuate interval through which the cradle and rocker members rotate during their dumping and return motions may be adjusted as desired in relation to the dumping characteristics of the dumping unit, cars and their loads. However, according to a particularly preferred embodiment, said dumping and return motions of the cradle and rocker members comprise rolling of said members during both of said motions within a common arcuate interval of about 160° or less.

The return motion of the cradle and unloaded car may be performed in any desired fashion. However, it is preferred that the return motion, like the dumping motion, be performed in prior and subsequent portions. The rolling of the cradle is preferably caused to occur during the prior portion of the return motion at least in part by the action of gravity. For this purpose, it is useful and preferred to so configure the assembly that the elevation of the combined center of gravity of the cradle and the unloaded car, in the dumping position, is at or above a line passing through the rotational axis of the cradle parallel to the cradle car rails, and that such center be displaced from the axis generally in the direction of the starting position of the cradle. Then, if the transition between the prior and subsequent portions of the return motion occurs when the cradle has rolled to a position about 90 degrees from the starting position, the cradle center of gravity can provide driving force to at least assist in driving the cradle to and beyond the transition, if desired. During the subsequent portion of the return motion, with the cradle and car moving in a range of positions within about 90° or less from starting position, rolling of the cradle is preferably caused to continue at least in part by forcing liquid against a piston having a driving connection with the cradle for displacing the cradle and car laterally and driving the cradle towards the starting position.

It will be appreciated that the apparatus of the invention may be embodied in a wide variety of forms. Thus, by way of example and not limitation the fluid actuated cylinder in the above-described apparatus may or may not be a hydraulic cylinder, including a piston and means for supplying and exhausting driving liquid to and from the cylinder. The arcs of the arcuate peripheries of the rocker members may or may not substantially coincide with a true circle. The cradle track of the apparatus may or may not be inclined down and away from the starting position.

The car dumper of the present invention may be utilized with any suitable form of car clamping devices or other immobilizing apparatus. However, as has been indicated above, the invention includes an optional but preferred form of apparatus in which the rocker members comprise overhanging upper portions, side portions which are at least in part open and car clamping means connected with and supported from said overhanging portions. This aspect of the invention, which is applicable to any of the other apparatus described herein, also has certain preferred embodiments.

For example, the upper portions of the rocker members may overhang substantially the entire width of a car receiving portion of the cradle. Also, lower, side and overhanging upper portions of the cradle may define a partial wheel that is generally of crescent shape with an arcuate peripheral surface supported and rollable on cradle track between car receiving and car dumping positions. The second side portion is preferably open throughout a major portion of the height of the car receiving portion of the cradle.

The car clamping apparatus just described has other alternative embodiments. For example, the car clamping member may be and preferably is of sufficient width for simultaneously engaging the upper edges of both sides of a railcar and clamping said car in the car receiving portion of the cradle. Preferably, the car clamping member which simultaneously engages the upper edges of both sides of the car is the sole clamping means contacting the car for clamping it in the car receiving portion of the cradle.

Figure 2:
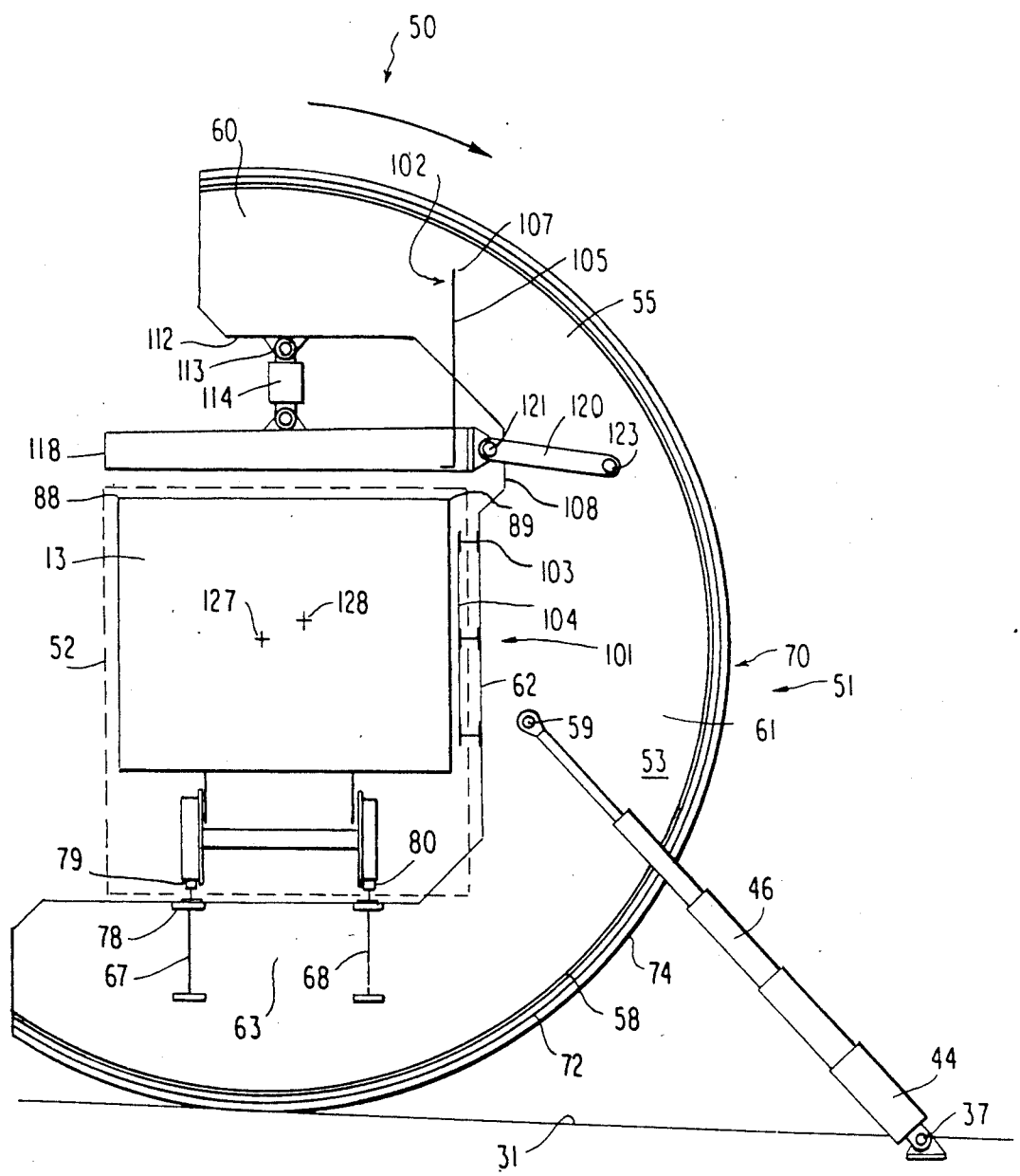
FIG. 2 is a vertical cross-section of a car dumper in accordance with the invention, similar to that of FIG. 1 except as described below, the view being taken perpendicular to the longitudinal axis of the device.
Figure 3:
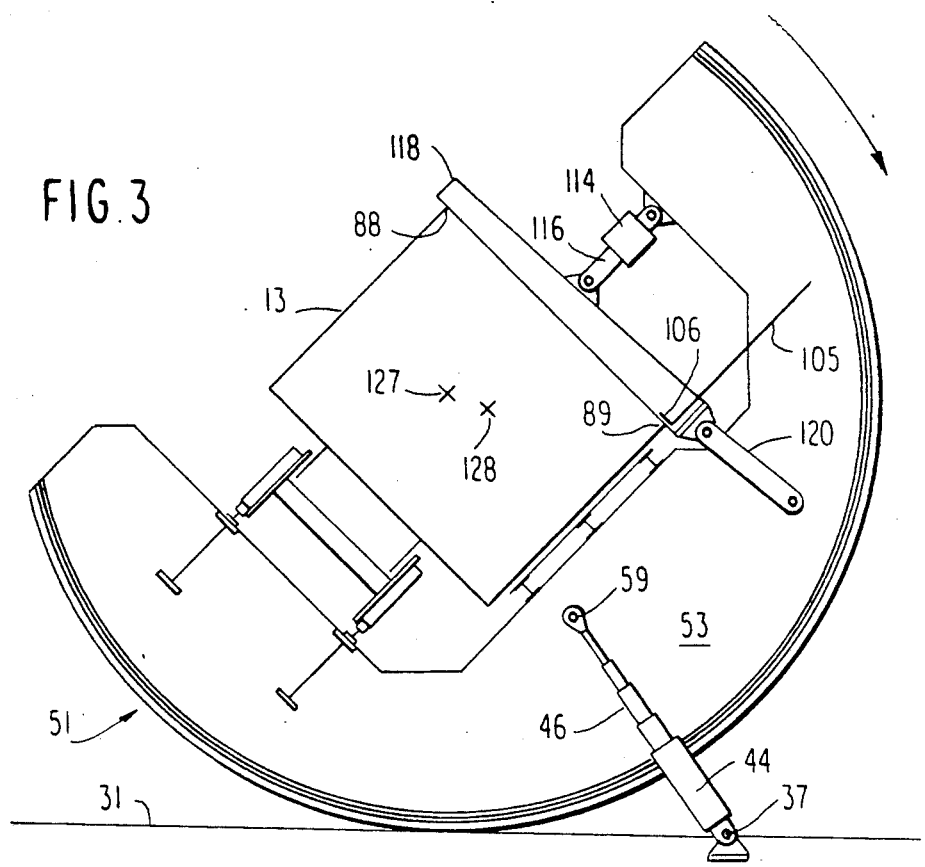
FIGS. 3-8 are a series of end views of the apparatus of FIG. 2, showing the dumper progressively rotated from starting position through a plurality of intermediate positions to its dumping position and back again.

The car clamping member, regardless of its length is preferably suspended from power means for reciprocation up and down for clamping and unclamping the car. Preferably, the overhanging upper portion of each rocker member supports such power means and the clamping members are connected with and supported from the overhanging upper portions through their connections with the power means. Preferably the overhanging upper portion of each rocker member includes supporting pivot means by means of which hydraulic clamping cylinders are suspended. Moreover, as shown in FIGS. 2 and 3, the car clamping member, when viewed in the cradle end view with the cradle in car-receiving position, is substantially horizontal, extends generally perpendicular to the car rails and is suspended through a pivotable connection with said power means affording relative up and down motion of its opposite ends as it moves into clamping position.

The above-described clamping aspect of the invention also includes the use of toggle links. Preferably, such toggle links are each connected by a pivotable connection to one of the clamping members and by another pivotable connection to one of the rocker members, for controlling the lateral positions of the clamping members during raising and lowering thereof. Alternatively, or in combination with the foregoing, the toggle links may be utilized for maintaining the clamping members generally horizontal as they move into and out of engagement with the top portion of the car.

Prior experience with top clamping car dumpers shows that inversion of a car is accompanied by an increase in the opposing forces mutually exerted on one another by the clamps and the upper edges of the cars. This results from the fact that during inversion, the upward force of the car springs is no longer opposed by the combined weight of the car and contents, whereby the spring upward force and said combined weight are no longer offsetting, and the spring force and car weight become additive. In prior art devices, means are provided for controlling car-clamp reactive forces during inversion of the car. Thus, the preferred clamping apparatus and other embodiments of the present invention are preferably provided with means for controlling car-clamp reactive forces during inversion of the car by relieving added pressure which has been generated within the power means. In a preferred embodiment of the foregoing, the power means are fluid actuated cylinders and the means for controlling car-clamp reactive forces include means for venting of fluid from the cylinders. In a particularly preferred embodiment of the foregoing, the means for venting fluid from the cylinders includes an adjustable pressure relief valve in one or more fluid supply or discharge lines of the cylinders.

Now, aided by the accompanying FIGS. 1-10, we turn to discussion of a specific embodiment of the invention which illustrates how the necessary and optional features of the invention may be combined into a single device representing what is presently believed to be the best mode for practicing the invention. Obviously, not all of the features shown are necessary for utilization of the invention, and this embodiment should therefore be construed as an illustration of a broader invention which may take a variety of forms.

In the embodiment disclosed in the drawings, as best shown in FIGS. 1 and 2, a loaded car supply area 11 includes a feeder track 12 for feeding a series of loaded open top hopper cars 13 across the end 14 of the feeder track onto car dumper 16. Feeder track end 14 rests on a projection 15 extending into a cavity 17 within which the car dumper is located. Cavity 17 includes a horizontal floor 18 below the elevation of feeder track 12 and extending between projection 15 and a similar projection 19 at the opposite end of the car dumper which supports a discharge track 20 for unloaded cars 21.

Floor 18 extends laterally, relative to the projected paths of the feeder and discharge tracks, extending to the edge of a pit 25, running generally parallel to the tracks and somewhat longer than the cars to be unloaded. Pit 25 receives coal or other load material dumped from cars. Also running laterally across floor 18 relative to the projected paths of the feeder and discharge tracks is a pair of parallel, spaced apart cradle track supports 26 and 27 which begin on one side of and close to said projected paths and extend through such projected paths, terminating as massive piers 28 and 29 which project laterally into the pit 25 and down to its floor, which is covered by load material in FIG. 1.

Aligned with and set into the upper surfaces 30 of cradle track supports 26 are a pair of flat metal plates constituting cradle tracks 31 and 32 that are inclined down and away from the projected path of the feeder and discharge tracks. Cradle tracks 31 and 32 are each provided with a series of apertures 33 which are further described below. Adjacent the respective cradle tracks are the lower pivots 37 of double-acting hydraulic cylinders 38 and 39 each having fluid supply and discharge hoses 40 and 41 extending through suitable openings 42 with covers 43 in floor 18 into tunnels (not shown) connecting the cylinders with the remaining components of a hydraulic system (shown in FIG. 10) for operating the cylinders. In this embodiment the cradle track supports 30 also constitute supports for the cylinders 38 and 39.

The dumper 16 has a rolling portion 50 comprising a car-receiving rollable cradle 51 which may be established in a starting position in which it is adjacent and in alignment with the feeder and discharge tracks. With the aid of the aforementioned hydraulic cylinders, cradle 51 may be rotated and simultaneously translated laterally first to a dumping position and then back to starting position. While FIG. 1 illustrates the use of double action hydraulic cylinders 38 and 39 for this purpose, FIG. 2 illustrates the replacement of cylinders 38 and 39 with single action hydraulic cylinders 44 and 45 (FIG. 10) with telescoping piston arrangements. The orientation of the cradle 51 when it is in starting position is shown in FIG. 2, whereas FIG. 1 shows the cradle during its rolling motion. Within cradle 51 is a car receiving portion 52 that is common to the apparatus of FIGS. 1 and 2, but is specifically outlined only in FIG. 2. Except for these facts and other differences noted below, FIGS. 1 and 2 are similar.

As shown in FIGS. 1 and 2, the cradle 51 includes a pair of rocker members 53 and 54 which bear the weight of the cradle and are themselves borne by the above-mentioned cradle tracks 31 and 32. Each rocker member may, for example, be fabricated as a hollow structure comprising an outer surface plate (exemplified by plate 55 on rocker member 53) and an inner plate (as exemplified by plate 56 on rocker member 54) bound together by suitable internal reinforcement (not shown). These inner and outer plates are similar in shape, positioned in parallel planes, spaced apart from one another and tied together along their circular peripheral edges 57 by an arcuate peripheral plate 58 to form a rigid structure. The remaining edges of the outer and inner plates complete the definition of the rocker members in a shape which may be generally described as a crescent, including an overhanging upper portion 60 which at least partially overhangs the car 13, a generally upright side portion 61 with a vertical inner edge 62 and a laterally projecting lower portion 63, located beneath the car-receiving portion 52.

The driving pivots 59 for connecting hydraulic cylinders 38 and 39 or 44 and 45 to cradle 51 are mounted on rocker members 53 and 54, and are preferably offset toward the dumping position from a straight line which includes that side of the car-receiving portion 52 of the cradle which is nearest the dumping position. In the present embodiment, the elevation of driving pivots 59 is intermediate those of the bottom and the top of the car-receiving portion 52.

Through each of the rocker member lower portions 63 extend a pair of parallel, longitudinal girders 67 and 68 which extend the entire length of the car unloader, having ends 69 which are positioned (when the loader is in starting position) closely adjacent to the end of the feeder track 12 and the beginning of the discharge track 20, respectively. The above-mentioned girders are held parallel and tied together by short transverse box beams 77 and/or other structures extending transversely between the inner surfaces of the girders at longitudinally spaced intervals. The girders and box beams assist in keeping the rocker members parallel, contribute to stiffening and resulting torsion resistance of the cradle structure and provide support, on the upper limbs 78 of the girders, for car rails 79. These rails are in alignment with the feeder and discharge tracks when the dumper is in its starting position and support the bottoms 80 of the wheels of car 13.

Additional stiffening is provided by longitudinal side beams, the lower side beam 84 being of substantially the same length as girders 67 and 68 and having an inner vertical surface 85 which generally corresponds with the vertical edges 62 of the cradles, the remainder of the profile of side beam 84 being set into cutouts 86 of corresponding shape formed in the cradle inner and outer plates 55 and 56 adjacent their respective vertical edges 62. An upper longitudinal side beam 87, parallel with lower side beam 84, is also substantially similar in length as compared to the girders 67 and 68, and pierces both rocker members in cutouts 86 at an elevation substantially above the height of the top edges 88 and 89 of car 13. Upper side beam 87 also has a vertical inner surface 90 in substantially the same plane as inner surface 85 of lower side beam 84. To the inner surfaces of these two beams is secured a massive spill plate 91 which extends throughout the length of the dumper, is of substantially the same length as the girders 67 and 68 and extends vertically from the level of car rails 79 up across the inner vertical surface of the lower and upper side beams to an upper edge 92, running substantially the entire length of the cradle, which also is substantially above the top edges 88 and 89 of car 13.

Further stiffening of the structure is provided by triangle braces 93 and 94 that are respectively secured to the outer ends 95 of the side beams 8 and 87 and to the outer surface plates 55 of the rocker members. Further bracing is provided by additional triangular bracing 96 secured to beams 84 and 87 intermediate their ends, extending between the beams and the inner surface plates 56 of the rocker members. Triangular bracing 96 is also secured to an auxiliary beam 97 extending longitudinally between the inner surface plates. The rocker members 53 and 54, girders 67 and 68, transverse box beams 77, side beams 84 and 87, spill plate 91, triangular bracing 93, 94, and 96, and auxiliary beam 97, all serve to define a cradle in which the rocker members are held parallel and prevented from torsional motion with respect to one another, so that the cradle 51 is capable of unitary rolling motion without substantial distortion.

Such rolling motion is facilitated by partial wheels 70 and 71, each representing a portion of a circular arc. The wheels are secured by flanges 72 and 73 to the inner surface plates 56 of each rocker member, and have circular peripheral surfaces 74 and 75 of slightly greater radius than arcuate plates 58. Peripheral surfaces 74 and 75 constitute at least a portion of and preferably substantially coincide with the entire peripheries of rocker members 53 and 54. Wheels 70 and 71 include radially projecting pins 76 in peripheral surfaces 74 and 75 for engaging with or protruding into the above-mentioned apertures 33 in cradle tracks 31 and 32 in order to prevent slippage between such tracks and wheels and to keep the cradle from cocking as it rolls back and forth on the cradle tracks.

Figure 9:
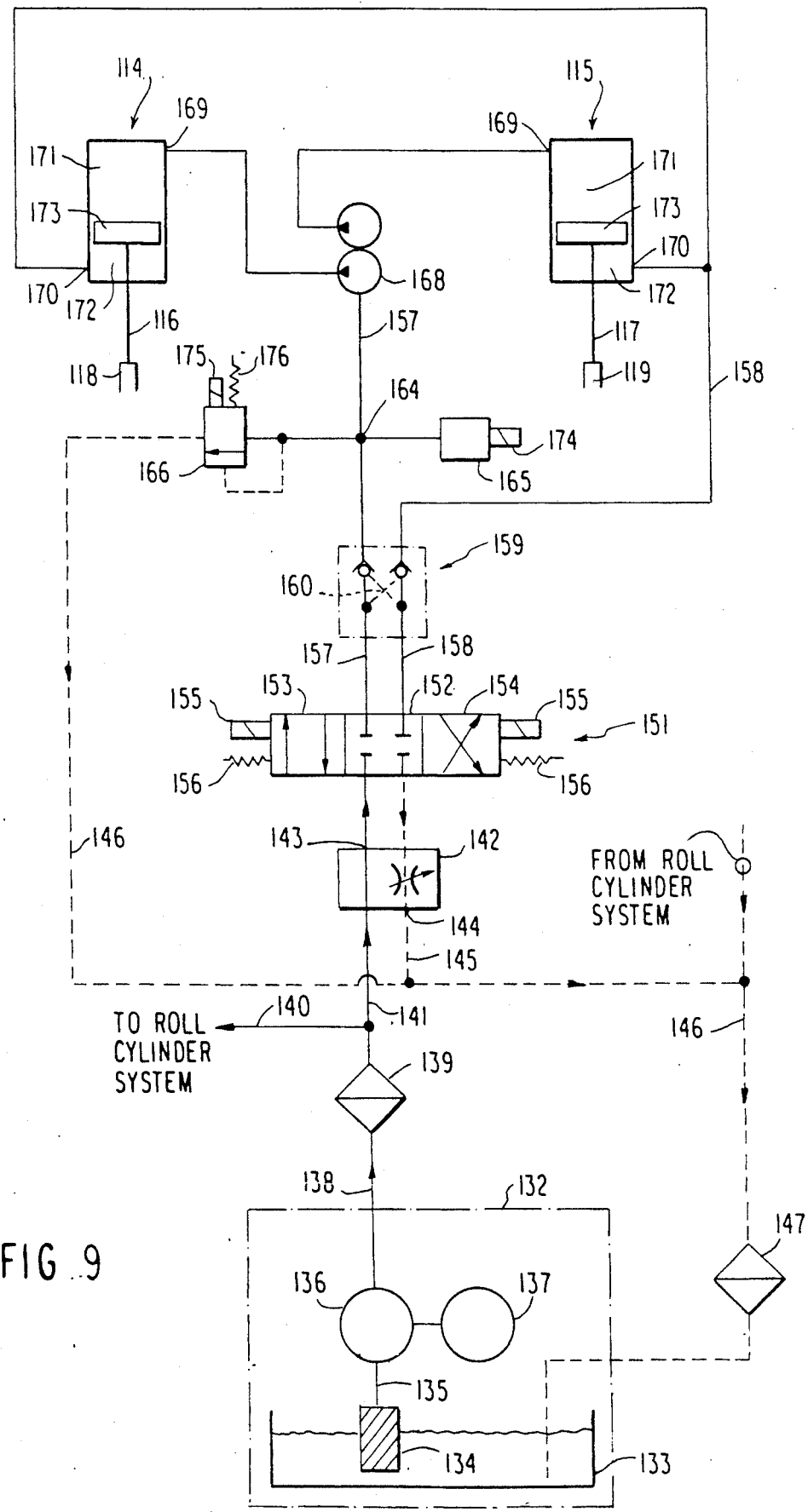
FIG. 9 is a schematic diagram of a clamping control system for the car dumper of FIGS. 2–8.

As best shown in FIG. 2, the foregoing overhanging upper portions 60 of the rocker members overhang at least about a major portion of the car-receiving portion 52 of the cradle 51, and preferably extend beyond the lateral center of the car-receiving portion. The undersides 112 of these overhangs include supporting pivots 113 supporting double-acting hydraulic clamping cylinders 114 and 115, the pistons 116 and 117 of which are not visible in FIGS. 1 and 2, but are shown in FIGS. 3 and 9. Pistons 116 and 117 are connected to and arranged to support and produce up and down unclamping and clamping motion of clamping members 118 and 119 that are capable of engaging both top edges 88 and 89 of car 13. Control over the lateral position and horizontal orientation of these clamping members is obtained with the aid of toggle links 120, each connected by a first pivotable connection 121 with one end of each clamping member and by a second pivotable connection 123 with one of the rocker members. During projection and retraction of clamping cylinders 114 and 115, toggles 120 restrict transverse rotational motion of the clamping members 118 and 119 while keeping them generally horizontal as they move into and out of engagement with the top edges 88 and 89 of the car 13.

Among the few differences between the subject matter of FIGS. 1 and 2 is the fact that in the FIG. 1 embodiment the toggles 120 extend through an aperture 122 in spill plate 91, whereas the spill plate 91 has been replaced in FIG. 2 by a car pad 101 and partial spill plate 102, obviating the need for aperture 122. Also, the absence of full spill plate 91 from the FIG. 2 embodiment makes it particularly convenient for the pivotable connection 121 between toggle 120 and each clamping member to be recessed in a cut out 108 in each side portion 61 of the rocker members, above car pad 101.

Car pad 101 is composed of a plate 104, disposed beside and of substantially the same size as the side of the car 13. Secured to and backed up by an array of horizontal, longitudinally extending I-beams 103, which are in turn secured to the generally upright side portions 61 of the rocker members, the plate 104 is able to bear the weight of the car and its load as the car is turned on its side during the dumping operation. Plate 104 may be fitted with or replaced by a vibrator assembly (not shown) to assist in discharging the contents of the car.

The partial spill plate 102 of the FIG. 2 embodiment is composed of a generally upright plate 105, preferably somewhat longer than the car 13, having a lower lip 106 arranged to move into and out of contact with that upper edge 89 of the car 13 toward which the car rolls during its dumping motion. This is conveniently accomplished by securing plate 105 to clamping members 118 and 119 so that lip 106 is respectively brought into and out of contact with car edge 89 when the clamping members are clamped and unclamped. Since the clamping members are clamped and unclamped respectively when the car is being dumped or moved on and off the cradle, the plate 105 will always be in position to divert the load over plate edge 107 whenever the car is being dumped.

Any suitable bracing (not shown) may be applied to the plate 105 to support it under the weight of the load material passing over it. Moreover, it may be found beneficial to provide skirts (not shown) which extend along the entire length of each of the long sides of the clamping members 118 and 119 and which (in starting position) extend upwardly from the clamping members a sufficient distance to fully protect the cylinders 114 and 115 from falling load material when the cradle 51, car 13, clamping members and skirts are inverted, whereby the skirts form, With plate 105, an inverted pocket for the cylinders. When such skirts are secured to both plate 105 and the clamping members, they can provide structural bracing for the plate.

FIGS. 2-8 illustrate the operating cycle of the present invention. As indicated previously, the apparatus is shown in starting position in FIG. 2. Once car 13 has been properly positioned longitudinally in car receiving portion 52 and has been immobilized against longitudinal motion, such as by track dogs (not shown), the dumping motion can begin.

The above-described prior portion of the dumping motion is preferably commenced solely through the action of gravity and is preferably caused by the combination of inclination of cradle track 31 down and away from the starting position and of the position of the center of gravity 128 of the car, load and cradle. In this embodiment, the center of gravity is offset from the longitudinal rotational axis 127 of the cradle in the direction of the dumping position and is at an elevation above that of the axis as shown in FIG. 2.

As the cradle 51 and car 13 incline toward the position shown in FIG. 3, the car leans toward and comes to rest against the car pad 101. Then, clamping members 118 and 119 are moved into forceful contact with the car upper edges 88 and 89 by extension of the pistons 116 (FIGS. 3 and 9) of hydraulic clamping cylinders 114 and 115, the clamping members being positioned with the aid of toggle 120. The car being thus immobilized in cradle 51, the dumping motion can continue to the position shown in FIG. 3.

FIG. 3 shows partial spill plate 105 as having moved along with clamping member 118 into contact with the leading edge 89 of the car. Also, cradle 51 has rolled about axis 127 while translating said axis from left to right, from the starting position toward the dumping position. The rotary-lateral motion of cradle 51 has shortened the distance between lower pivot 37 and driving pivot 59 on rocker member 53, thus forcing a shortening of the telescoping piston of single action hydraulic cylinder 44. It will be appreciated that in this and in the remaining FIGS. 4-8, the action at the other end of the cradle 51, i.e. at rocker member 54, will be the same, the two rocker members being caused to roll in synchronism by cradle track apertures 33 and the cooperating pins 76 in wheels 70 and 71.

Figure 4:
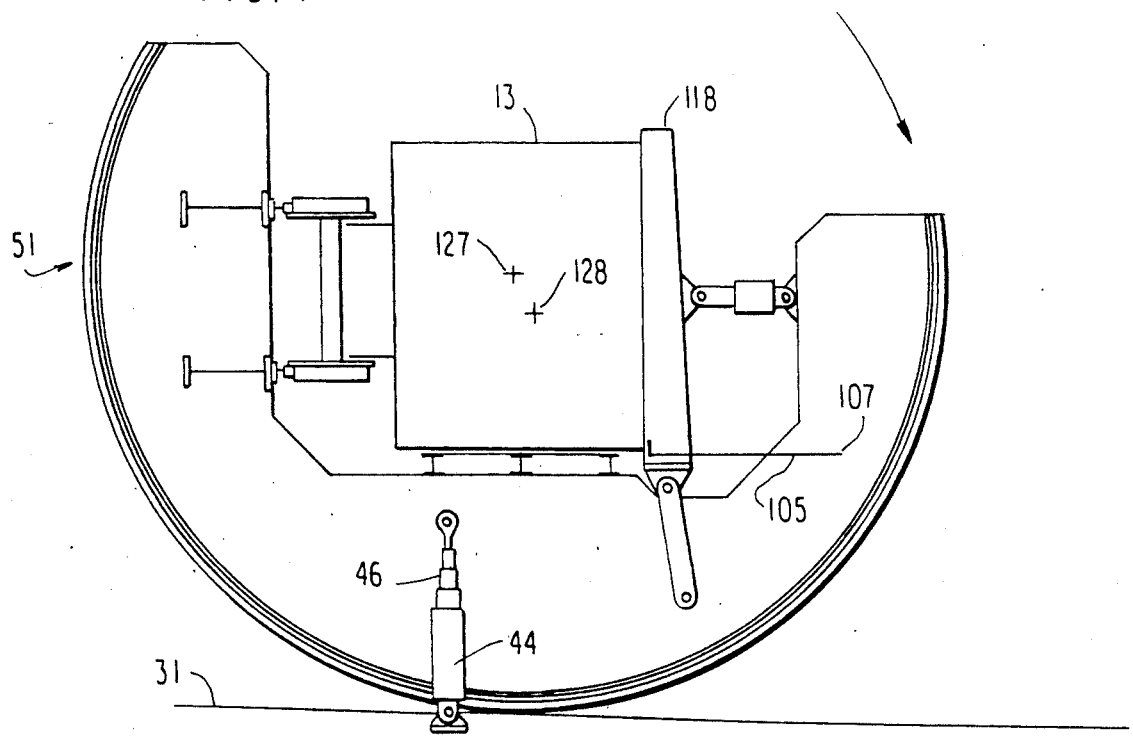

During a continuation of the prior portion of the dumping motion, cradle 51 continues rolling down inclined track 31, further collapsing piston 46 of hydraulic cylinder 44 and turning car 13 on its side with clamping member 118 and spill plate 105 still in place as shown in FIG. 4. At this position, some of the load will have rolled out on to spill plate 105 and may be falling over its edge 107. Note the substantial distance between lip 106 and hydraulic cylinder 104 which greatly minimizes opportunities for falling load material to impact upon piston 46. The prior portion of the dumping motion continues until piston 46 reaches its maximum extent of retraction, as installed, which in the present embodiment approximately coincides with the cradle position shown in FIG. 4. For the present embodiment, this marks the transition between the prior and subsequent portions of the dumping motion. At or near the transition point, the inclination of cylinder 44, which was initially toward the starting position, passes through an upright position into an inclination in the direction of the dumping position.

Figure 5:
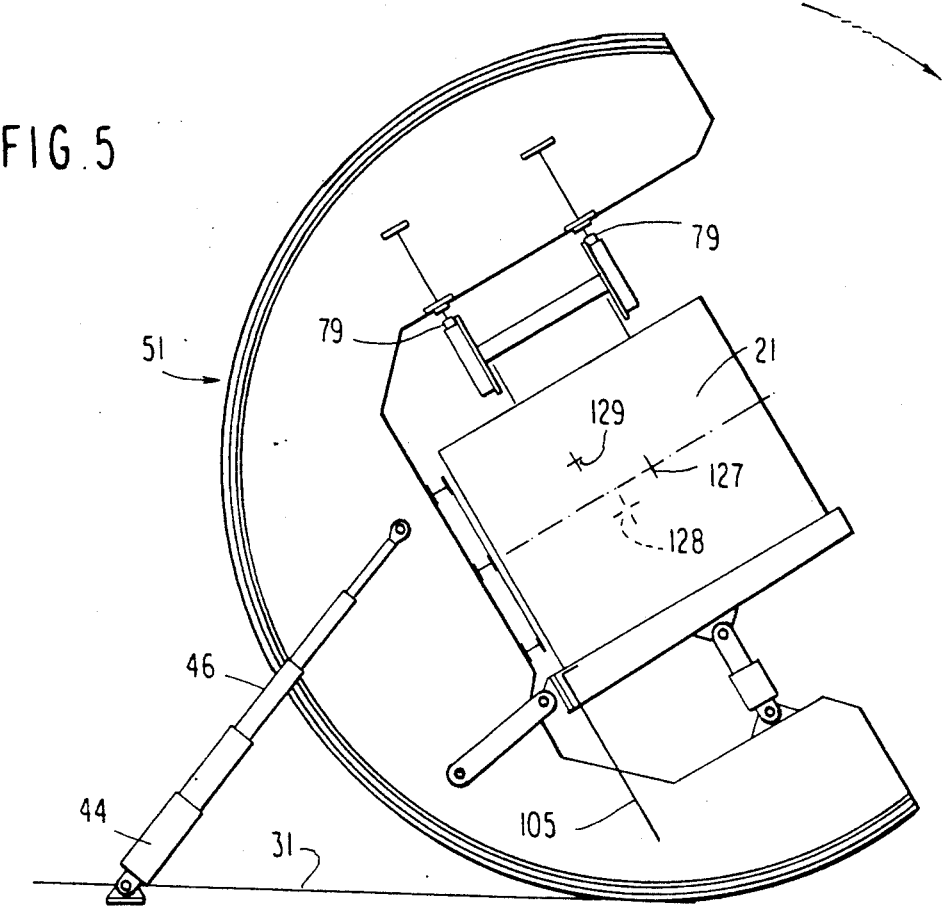

Further progress in the dumping motion, including the subsequent portion thereof, is illustrated in FIG. 5. There, the rotation of cradle 51 and car 13 have progressed through about 160° of rotation down inclined track 31 from the starting position to the dumping position. Hydraulic cylinder 44 is now inclined toward the dumping position and its piston 46 has re-extended. Spill plate 105 continues to protect hydraulic cylinder 44 and its piston 46 from falling load material. Cradle 51 is preferably retained in the position of FIG. 5 for a predetermined time sufficient to complete the dumping of the load from car 13.

As the load is dumped, the center of gravity of the cradle, including the unloaded car 21, shifts upward to establish a new center of gravity 129 which, in the dumping position, is at or above a line passing through the cradle rotational axis 127 parallel to the cradle car rails 79, and is displaced from the axis generally in the direction of the starting position of the cradle 51. This shift, resulting from the geometry of the cradle, at least assists in rolling the cradle back up inclined track 31 toward the starting position. This motion continues until the cylinder 44, piston 46, cradle 51 and car 13 reach the position shown in FIG. 6, which represents a transition between the prior portion and a subsequent portion of the return motion. With the cradle in the position illustrated in FIG. 6, hydraulic fluid under pressure is supplied to cylinder 44 to commence the subsequent portion of the return motion. In this embodiment, cylinder 44 is initially assisted by center of gravity 129 in driving the cradle beyond the transition and through part of the subsequent portion of the return motion, and then progressively moves the assembly in sequence to the positions shown in FIGS. 7 and 8.

Figure 8:
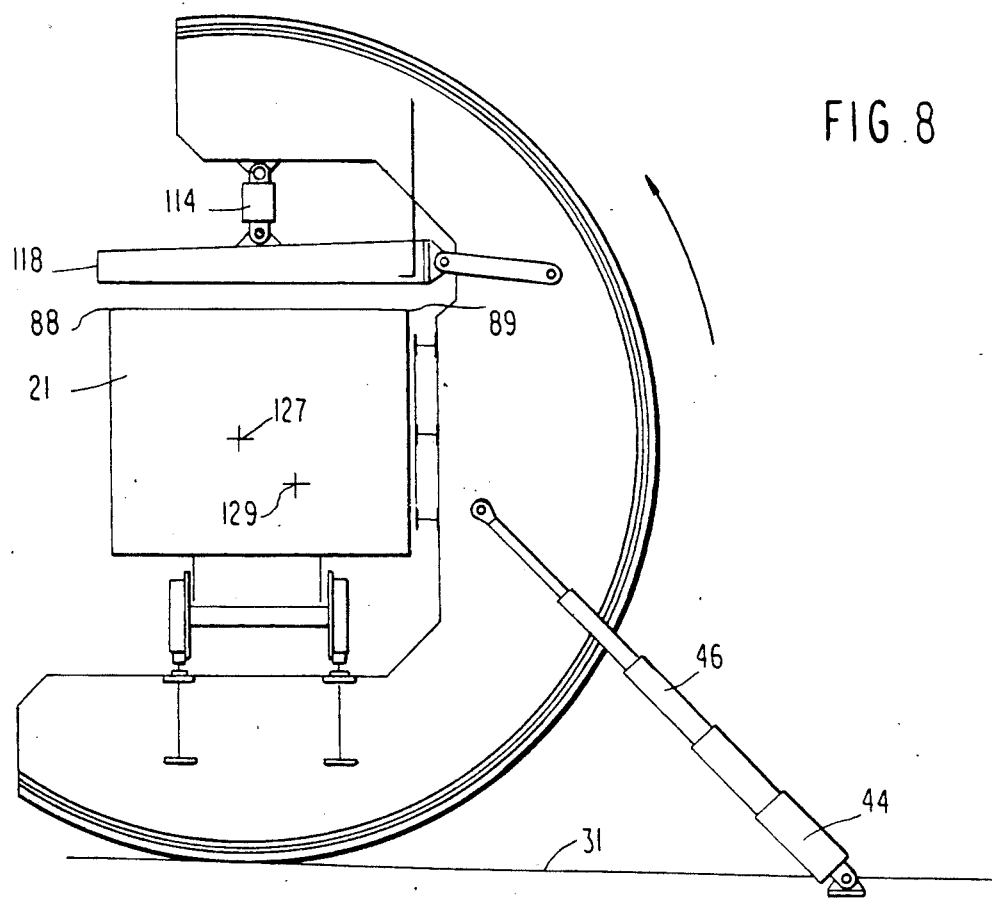

Shortly before the cradle 51 reaches the starting position, illustrated in FIG. 8, hydraulic cylinders 114 and 115 (FIGS. 1 and 9) are retracted, lifting clamping members 118 and 119 free of the upper edges 88 and 89 of car 13. When the cradle reaches starting position the above-mentioned track dogs (not shown) are released and the car may then be moved from cradle 51 onto a discharge track such as track 20 of FIG. 1. Then another loaded car may be placed in cradle 51 and the foregoing cycle may be repeated.

Figure 10:
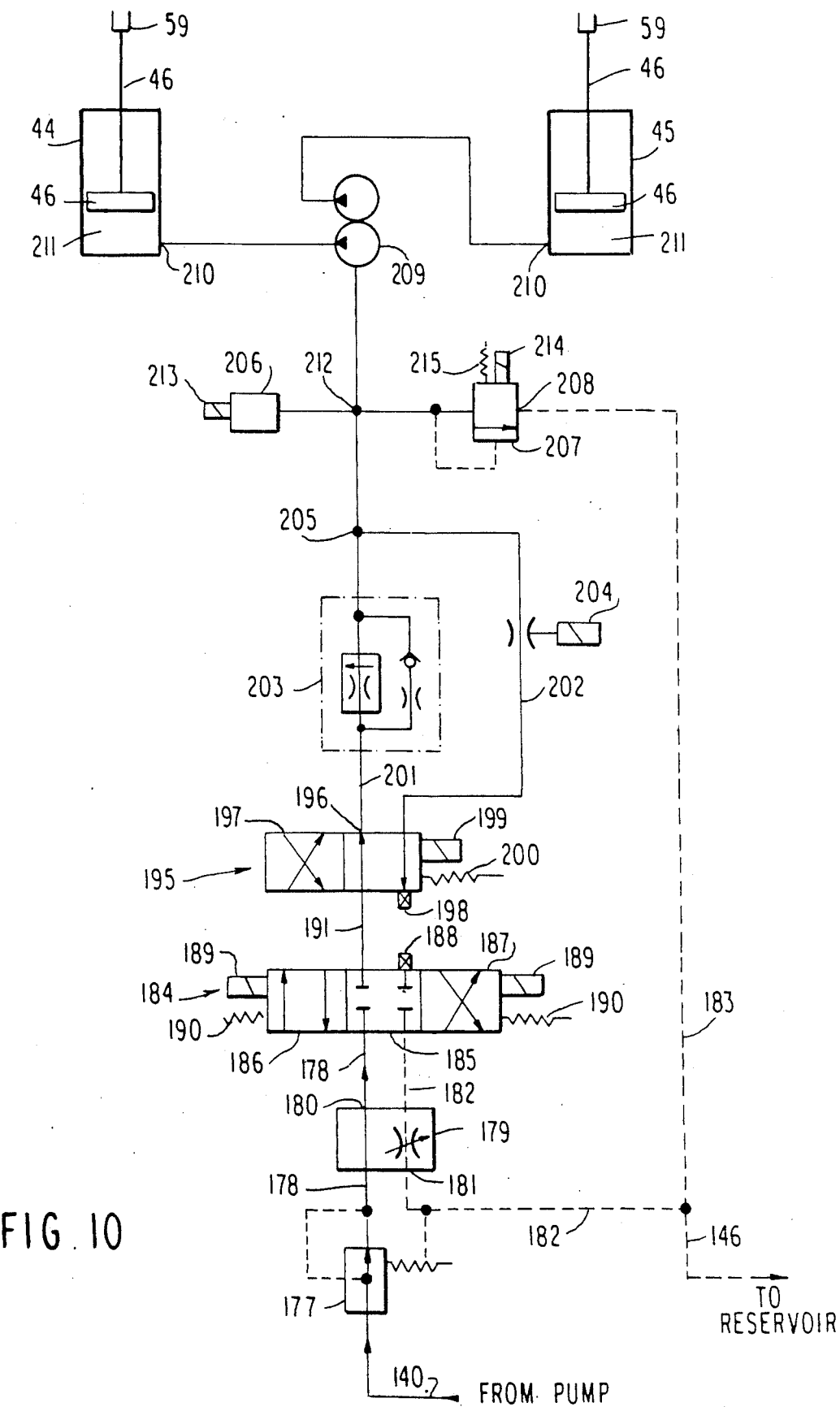
FIG. 10 is a schematic diagram of a roll control system for the car dumper of FIGS. 2–8.

FIGS. 9 and 10 disclose systems for providing hydraulic power and control for the clamping cylinders 114 and 115, and for the preferred single action roll cylinders 44 and 45 (illustrated by cylinder 44 of FIGS. 2-8) which roll the cradle 51 along cradle track 31. All of these hydraulic cylinders utilize a common hydraulic pump unit 132 disclosed in FIG. 9. It includes a hydraulic liquid reservoir 133 in which is immersed the strainer 134 of inlet conduit 135 leading to hydraulic pump 136 of sufficient pumping capacity to produce the desired rate of traverse in the roll cylinders 44 and 45. A suitable motor 137 is provided, having a driving connection with pump 136. Hydraulic liquid under pressure is thus discharged through discharge conduit 138 and a 5 micron filter 139 to a junction through which a flow of hydraulic fluid may proceed through a branch line 140 to the roll cylinders 44 and 45, discussed below in connection with FIG. 10, and to the clamping cylinders 114 and 115 via supply conduit 141 of FIG. 9.

Remaining for the moment with FIG. 9, we see that supply conduit 141 passes through the unregulated port 143 of a flow control valve 142 which has a manually controlled regulated port 144. Port 143 supplies hydraulic fluid under pressure to clamping cylinders 114 and 115 via other components to be described below, while exhausted fluid from said cylinders eventually reaches regulated port 144 and passes by return lines 145 and 146 through 10 micron filter 147 to reservoir 133.

The operation of cylinders 114 and 115 is basically controlled by a four-way double solenoid spring centered control valve 151 comprising a closed section 152, a straight through open section 153 and a cross over open section 154. Lateral motion of the control valve sections under the influence of actuator means (e.g. solenoids) 155 and spring means 156 can selectively bring cylinder advance circuit 157 and cylinder retract circuit 158 respectively into direct communication with supply conduit 141 and return line 145 (via section 153), or cut off all such communication (via section 152), or reverse the foregoing communication (via section 154). Cylinder advance and retract circuits 157 and 158 both pass separately through a pilot operated check valve 159 with internal actuator 160 which has the characteristic of resisting downward flow in both circuits, but opening both circuits whenever there is positive pressure in either circuit between check valve 159 and control valve 151.

Cylinder advance circuit 157 continues through a four-way junction 164 connected to pressure transducer 165 having sensing coil 174; to pilot operated pressure relief valve 166 having actuator means 175, spring means 176 and an outlet 167 in communication with reservoir 133 via return line 146; and to flow divider 168 which equally divides the flow through cylinder advance circuit 157 between the upper supply/discharge ports 169 of clamping cylinders 114 and 115. Pistons 173 divide each of the cylinders 114 and 115 into an upper-/advance portion 171 and a lower/retract portion 172, served respectively by upper supply/discharge port 169 and lower supply/discharge port 170, the latter being connected with cylinder retract circuit 158 through pilot operated check valve 159 and thence to four-way control valve 151.

Turning now to FIG. 10, branch line 140 is connected to pressure reducing valve 177 whose outlet is directed into supply conduit 178 which feeds hydraulic fluid under pressure to the hydraulic cylinders 44 and 45 through other components to be described below. Exhausted hydraulic fluid being returned via manually adjustable regulated port 181 of flow control valve 179 via return lines 182 and 146 to reservoir 133 of FIG. 9.

Supply conduit 178 furnishes hydraulic fluid under pressure to four-way double solenoid spring centered control valve 184 having closed section 185, straight through open section 186, cross-over open section 187, actuator means 189 and spring means 190 similar to those of valve 151 of FIG. 9, but differs from valve 151 in having a blocked port 188. The open upper port of control valve 184 connects to a common cylinder advance/retract circuit 191, which in turn feeds into three-way solenoid valve 195 having a straight through open section 196, cross-over open section 197, actuator means 199, spring means 200 and blocked port 198. The two open ports on the upper side of three-way valve 195 connect respectively with a rapid traverse line 201 and slow traverse line 202 which respectively contain a pressure compensated throttle valve 203 and a proportional pressure compensated flow control valve 204 and eventually rejoin one another at a three-way junction 205.

A four-way junction 212 connects the joined rapid and slowtraverse lines to a pressure transducer 206 having sensing coil 213; to pilot operated pressure relief valve 207 having actuator means 214, spring means 215 and an outlet 208 in communication with reservoir 133 (FIG. 9) via return lines 183 and 146; and to flow divider 209 which equally divides the flow of hydraulic liquid under pressure from pressure compensated throttle valve 203 into two equal portions directed to the supply/discharge ports 210 feeding into the blind end 211 of hydraulic cylinders 44 and 45, the latter being connected via their pistons 46 with the driving pivots 59 of cradle 51, said pivots and cradle being shown in FIGS. 1-8.

The hydraulic system of FIGS. 9 and 10 operates in the following manner. When the cradle 51 is in starting position and a loaded railcar 13 is present thereon in proper position, clamping of the car is performed with the apparatus of FIG. 9.

Clamping of the car may for example be initiated by operating personnel who observe the car and initiate clamping by actuating control valve 151. Or the valve 151 may be actuated automatically by a signal sent to the top clamping hydraulic system by any suitable sensing means (not shown) capable of ascertaining when an empty railcar has left the cradle and has been replaced with a properly placed loaded car. At this time the four way control valve 151 is shifted from the center position to the right causing pressurized hydraulic fluid to flow through unregulated port 143 of flow control valve 142, through the control valve 151 and into the left side of the pilot operated check valve 159.

When there is no pressure or relatively low pressure on that side of the control valve 151 which is nearest cylinders 114 and 115, pilot operated check valve 159 prevents downward flow in both the cylinder advance and retract circuits 157 and 158. However, substantial pressure in either of the lower ports of this check valve opens the other port and allows fluid to flow through the other port back to the reservoir.

Initially, pressurized fluid flows at relatively low pressure through the pilot operated check valve 159 toward the flow divider 168. On its way it passes pressure transducer 165 and pilot operated pressure relief valve 166. After passing pressure relief valve 166 the flow of hydraulic fluid enters flow divider 168, which divides the flow equally between the two hydraulic cylinders 114 and 115. The fluid enters the upper/advance portions 171 of these double acting hydraulic cylinders, causing their pistons 173 to advance slightly, building substantial pressure throughout the advance circuit 157 and that portion of retract circuit 158 which is above check valve 159. This opens check valve 159, thus causing further movement of pistons 173, discharge of fluid from cylinder lower/retract portions 172 into retract circuit 158 and extension of pistons 116 and 117, thus moving clamping members 118 and 119 downward toward the top of the railcar.

Fluid discharged in the above manner via retract circuit 158 passes through check valve 159, four-way control valve 151, regulated port 144 of flow control valve 142 and return lines 145 and 146 to the reservoir 133 of hydraulic pump unit 132. Regulated port 144 adjustably controls the rate of flow of fluid and therefore the rate of traverse of the cylinders and clamping members. As clamping members 118 and 119 enter into clamping engagement with the car, hydraulic pressure builds in the cylinder advance circuit. Pressure transducer 165 registers on an electronic control panel (not shown) the pressure applied to pilot operated pressure relief valve 166. When pilot operated pressure relief valve 166 senses pressure building up above a preselected pressure, it will vent sufficient fluid to reservoir 133 via outlet 167 and return line 146 to reduce the pressure to a pre-established value. Thus this valve, which may be and preferably is adjustable, is capable of limiting the mechanical pressure applied to the car during clamping in the starting position, and is also capable of controlling car-clamp reactive forces during later inversion of the car by relieving added pressure which has been generated within cylinders 114 and 115.

Shortly before, but preferably after the loaded railcar has been clamped in cradle 51 in the above-described manner, rolling of the cradle can be commenced using the hydraulic system shown in FIG. 10, which relies in part (as explained above) on portions of the equipment in FIG. 9. Just prior to commencement of rolling, hydraulic cylinders 44 and 45 are extended as exemplified in FIG. 2 and resisting through driving pivots 59 the downward force exerted by gravity on the right side of cradle 51 resulting from displacement of its center of gravity relative to its axis of rotation, thereby generating pressure in the fluid within the cylinders and attached hydraulic circuit illustrated in FIG. 10.

Rolling can be initiated by operating personnel, or can be initiated automatically by a signal from any suitable sensing means (not shown) such as a pressure transducer in the clamping cylinder advance circuit of FIG. 9. This is done by shifting four way control valve 184 from center position to the left. It is not possible for pressurized fluid to flow through pressure reducing valve 177, unregulated port 180 of flow control valve 179, and control valve 184 because flow is blocked in one of the two outlet ports 188 by a plug.

With control valve 184 in the above-described position, fluid pressurized within the blind ends 211 of hydraulic cylinders 44 and 45 can return to reservoir 133 via flow divider 209, passing by the pressure transducer 206 and the pilot operated pressure relief valve 207, and flowing through pressure compensated throttle valve 203, three way solenoid valve 195, four way control valve 184, flow regulated port 181 of flow control valve 179, and return lines 182 and 146, thus permitting the cradle to roll under the influence of gravity toward the position shown in FIG. 4. The rate at which the foregoing fluid flow and roll occur can be regulated by adjustment of flow control valve 179, thus affording an opportunity to retard the rate of roll if desired.

When the cradle has rolled to or past the position shown in FIG. 4 and hydraulic cylinders 44 and 45 reach maximum retraction, hydraulic fluid is forced against the pistons 46 of these cylinders, thereby exerting force upon cradle 51 through driving pivots 59 for displacing the cradle and car laterally and driving said cradle towards the dumping position. This action may be started by operating personnel or automatically by a signal from any appropriate sensing means capable of sensing the position of the cradle, such as limit switches, mercury switches carried on the cradle and light energy sensing devices, including photocells and laser devices. In any event, the four way control valve 184 is shifted from its left side position to its right side position.

Shifting four way control valve 184 to this new position causes pressurized fluid: to pass through and have its pressure controlled by pressure reducing valve 177; to pass through unregulated ports 180 of flow control valve 179, four way control valve 184, three way solenoid valve 195, and pressure compensated throttle valve 203 (which also controls pressure); to proceed past pressure transducer 206 and pilot operated pressure relief valve 207; and finally to move through flow divider 209 and into blind ends 211 of hydraulic cylinders 44 and 45, causing rolling of the cradle 51 toward its dumping position. The system remains in this mode of operation until the cradle reaches the dumping position shown in FIG. 5. While rolling can be terminated by manual control, it is preferred that this be done automatically by an electronic signal from any suitable sensing means capable of sensing cradle position, which signal will cause four way control valve 184 to de-energize and shift to its center closed position 185, thereby locking the cradle in the dumping position.

Figure 6:
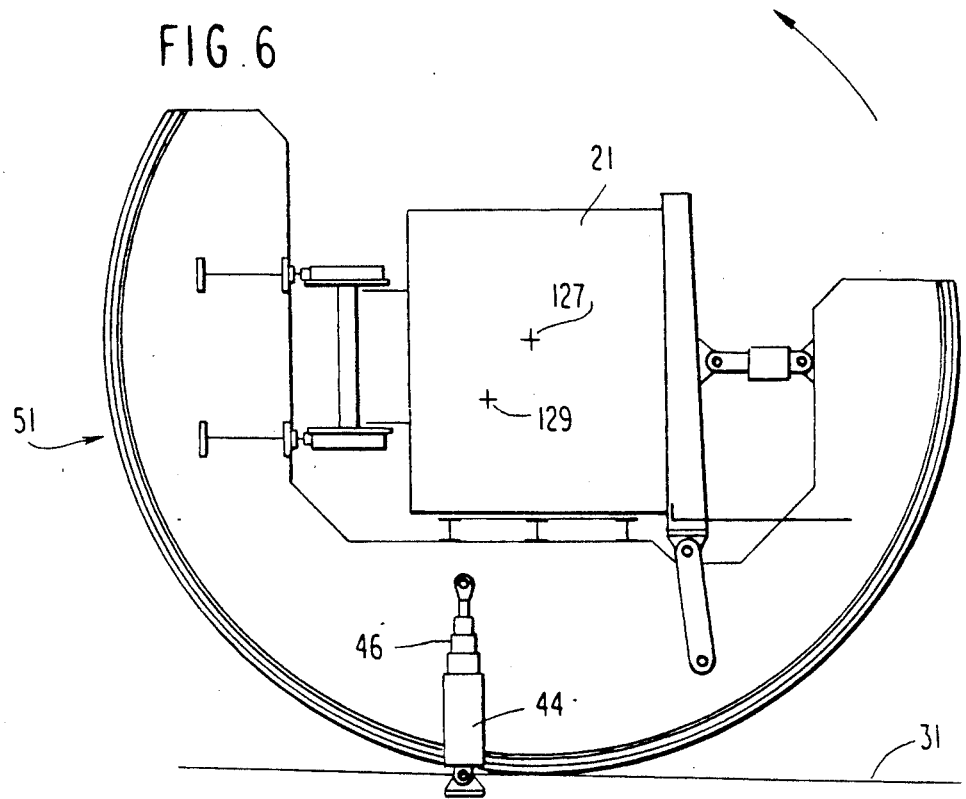
Figure 7:
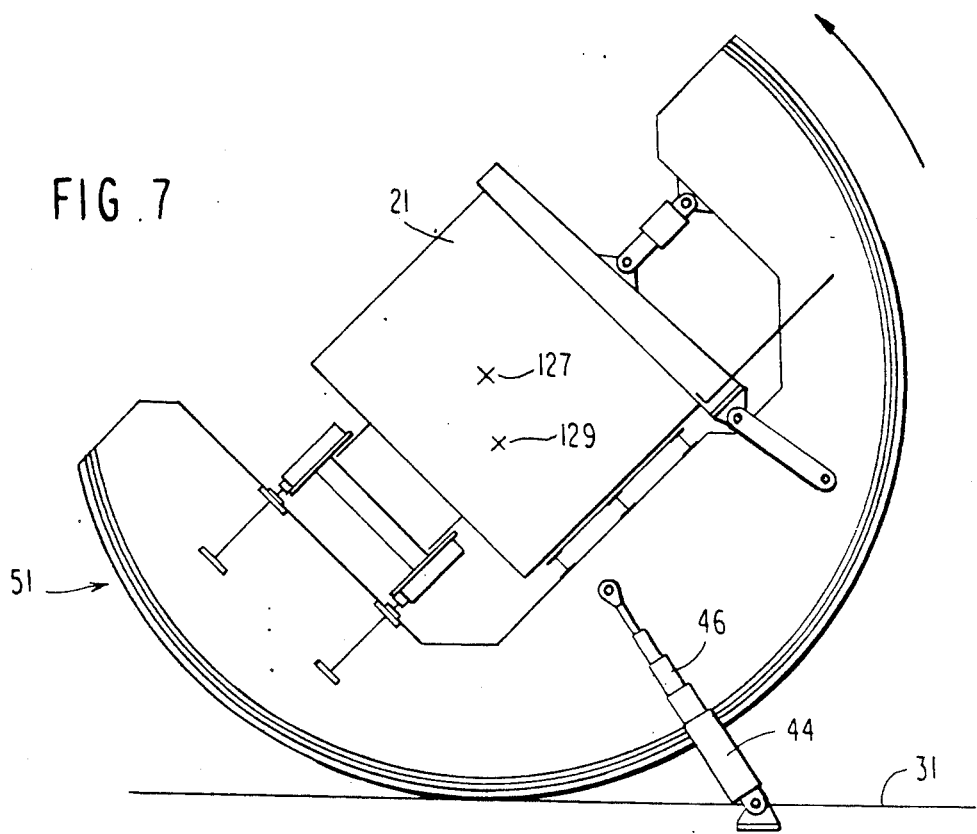

Operation of the hydraulic system to produce the return motion of the cradle from dumping position to starting position, as illustrated in FIGS. 6–8, is similar to the above-described dumping action except for the last few degrees of rotation of the cradle prior to reaching starting position. When the cradle enters the last few degrees of rotation, manual control or, preferably, an electronic signal is used to de-energize three way solenoid valve 195, shifting it to the right and causing the pressurized fluid to flow through the proportional pressure compensated flow control valve 204 in slow traverse line 202 instead of pressure compensated throttle valve 203 in rapid traverse line 201. This redirection of flow slows the cradle sufficiently so that it can be stopped gently. When cradle 51 reaches its final or starting position, four-way control valve 184 is de-energized and returned to its center position, three way solenoid valve 195 is de-energized so that is again ready for flow to be directed through pressure compensated throttle valve 203 during the next operating cycle, the pressure in the system is controlled and maintained by the pilot operated pressure relief valve 207 and the cradle 51 is stopped and held stationary in starting position.

To retract hydraulic cylinders 114 and 115, causing clamping members 118 and 119 to lift and release the railcar, four way control valve 151 of FIG. 9 is shifted to the left. Pressurized fluid flows through unregulated port 143 of flow control valve 142, control valve 151 and the right side of pilot operated check valve 159. As pressure builds on the inlet side of the check valve in a manner analogous to that described in the advance cycle above, the left side of the check valve opens causing fluid to flow opposite to the direction in which it flowed in the advance portion of the operating cycle. More particularly the opposite flow occurs in those portions of the cylinder advance and retract circuits which are located above check valve 159, thereby causing flow into cylinder lower/retract portions 172 and out of cylinder upper/advance portions 171, accompanied by reverse movement of the pistons 173 and pistons 116 and 117 of cylinders 114 and 115, thereby retracting the clamping members. The empty car may now be removed and replaced by another loaded car which is dumped in the same manner described above.

Persons skilled in the art will readily appreciate that the foregoing embodiment can be modified in a wide variety of ways without departing from the spirit of the invention. Thus, the invention should be construed as including all subject matter within the literal scope of the following claims and all equivalents thereof.

We claim:

1. Apparatus or dumping top-unloading railcars comprising:
   A. a car-receiving cradle, rollable between a generally upright starting position for receiving a loaded car and a dumping position in which the cradle has been sufficiently inverted for dumping the contents of a car carried therein, and having
      1. a car receiving portion,
      2. a center of gravity, including the mass of any loaded car in said car-receiving portion,
      3. a longitudinal axis,
      4. rocker members with arcuate peripheries extending substantially in planes running transverse to said axis for supporting said cradle, and
      5. driving pivot means connected with said rocker members for applying force to the rocker members in at least one position which is offset laterally from the side of the car receiving portion of the cradle, in the direction of the dumping position, as viewed in a transverse cross section of the cradle when it is in starting position;
   B. cradle track running laterally of said longitudinal axis beneath and supportively engaging said rocker members for rolling and lateral displacement of said cradle along said cradle track in a dumping motion which includes prior and subsequent portions;
   C. at least one fluid actuated cylinder having
      1. a lower pivot,
      2. a support to which said pivot is connected, the lateral location of said support being intermediate the positions occupied by the cradle when in its starting and dumping positions, and
      3. a driving connection through said driving pivot means with said cradle, said lower pivot and driving pivot means being positioned for causing the cylinder:
         a. to incline toward the cradle and at an angle less than 90° relative to the cradle track when the cradle is in starting position,
         b. to increase in inclination relative to the cradle track by pivoting about the lower pivot during rolling of the cradle along the cradle track during the prior portion of the dumping motion,
         c. to pass through a position which is at an angle of 90° with the cradle track and corresponds to a give rotational position of the cradle intermediate the starting and dumping positions, and
         d. to continue pivoting in the subsequent portion of the dumping motion until the cylinder is inclined toward the cradle and at an angles less than 90° relative to the cradle track when the latter reaches dumping position.

2. Apparatus for dumping top-unloading railcars comprising:
   A. a car-receiving cradle, rollable between a generally upright starting position for receiving a loaded car and a dumping position in which the cradle has been sufficiently inverted for dumping the contents of a car carried therein, and having
      1. a car receiving portion, including car rails for receiving a loaded car into the cradle at a predetermined elevation,
      2. a center of gravity, including the mass of any loaded car in said car-receiving portion,
      3. a longitudinal axis,
      4. rocker members with arcuate peripheries extending substantially in planes running transverse to said axis for supporting said cradle,
      5. driving pivot means connected with said rocker members for applying force to the rocker members in at least one position which is offset laterally from the side of the car receiving portion of the cradle, in the direction of the dumping position, as viewed in a transverse cross section of the cradle when it is in starting position, and
      6. clamping means for clamping the car against said car rails in said car-receiving portion of the cradle and holding the car in place substantially at said predetermined elevation during its dumping motion and inversion, throughout its presence in dumping position and during its return motion to starting position;
   B. cradle track running laterally of said longitudinal axis beneath and supportively engaging said rocker members for rolling and lateral displacement of said cradle along said cradle track;
   C. at least one fluid actuated cylinder having
      1. a lower pivot,
      2. a support to which said pivot is connected, the lateral location of said support being intermediate the positions occupied by the cradle when in its starting and dumping positions, and
      3. a driving connection through said driving pivot means with said cradle, said lower pivot and driving pivot means being positioned for causing the cylinder:
         a. to retract during a prior portion of the dumping motion during which the cradle rotates through an angular interval in the range of about 70 to about 110 degrees from its starting position,
         b. to cease retracting at a transitional position corresponding to a given rotational position of the cradle intermediate the starting and dumping positions thereof,
         c. to thereafter extend in a subsequent portion of the dumping motion, d. after dumping of the car, to retract during a prior portion of the return motion of the cradle toward its starting position, e. to cease retracting at said transitional position, and f. to extend in a subsequent portion of the return motion, D. the condition of the cradle track with respect to
1. its being inclined or not inclined from the horizontal and
2. the position of the center of gravity of the cradle being coordinated for causing rolling of the cradle to continue at least in part by gravity (a) during at least the prior portion of its dumping motion, and (b) during at least the prior portion of its return motion.

3. Apparatus for dumping top-unloading railcars comprising:

A. a car-receiving cradle, rollable between a generally upright starting position for receiving a loaded car and a dumping position in which the cradle has been sufficiently inverted for dumping the contents of a car, and including
1. a longitudinal axis,
2. rocker members with arcuate peripheries,
3. car rails mounted within said rocker members for supporting a loaded car on said cradle, and
4. a combined center of gravity of the car, of its load and of said cradle located relative to the peripheries of said rocker members for causing said cradle, a. with a loaded car thereon, to lower its center of gravity while moving from said starting position in a prior portion of its dumping motion comprising an angular interval in the range of about 70 to about 110 degrees and to continue beyond said interval to said dumping position in a subsequent portion of its dumping motion, and b. with an emptied car thereon, to lower its center of gravity in a prior portion of its return motion from said dumping position and, while passing through said angular interval to said starting position, to elevate its center of gravity in a subsequent portion of said return motion;

B. cradle track running laterally of said longitudinal axis beneath and supportively engaging said rocker members for rolling and lateral displacement of said cradle along said cradle track between said starting and car dumping positions; and C. at least one fluid actuated cylinder connected with said cradle for applying fluid under pressure for moving said cradle beyond said interval during its car-dumping motion and within said interval during its return motion.

4. Apparatus according to claim 1, 2 or 3 wherein said dumping and return motions of said cradle and rocker means comprises rolling of said members during both of said motions within a common arcuate interval of about 160 degrees or less.

5. Apparatus according to claim 1, 2 or 3 including means for limiting the rotational velocity of the cradle to less than its free-rolling velocity during the prior portion of the dumping motion.

6. Apparatus according to claim 1, 2 or 3 wherein the arcs of said arcuate peripheries of said rocker members substantially coincide with a true circle.

7. Apparatus according to claim 1, 2 or 3 wherein, in the starting position, the elevation of the driving pivot means is below the top edges of the car.

8. Apparatus according to claim 1, 2 or 3 wherein, in the starting position, the elevation of the driving pivot means is above the bottom of the car wheels.

9. Apparatus according to claim 1, 2 or 3 wherein, in the starting position, the elevation of the driving pivot means is intermediate that of the bottom of the car wheels and the top edges of the car.

10. Apparatus according to claim 1, 2 or 3 wherein, in the starting position, the elevation of the driving pivot means is below the combined center of gravity of the cradle and a loaded car.

11. Apparatus according to claim 1, 2 or 3 wherein the condition of the cradle track with respect to its being inclined or not inclined from the horizontal and to the position of the center of gravity of the cradle are coordinated for causing rolling of the cradle to continue at least in part by gravity during a portion of the dumping motion including up to, through and beyond said give rotational position.

12. Apparatus according to claim 1, 2 or 3 wherein a portion of the cradle track is inclined down and away from the starting position, said center of gravity, in the starting position, is at a sufficient elevation and lateral position, relative to a series of shifting locations at which the peripheries of the rocker members contact the cradle track, for promoting rolling of said rocker members along the cradle track toward the dumping position, and means are provided for limiting the rotational velocity of the cradle to less than its free-rolling velocity during the prior portion of the dumping motion.

13. Apparatus according to claim 1, 2 or 3 wherein said cylinder has a telescoping piston.

14. Apparatus according to claim 1, 2 or 3 wherein the fluid actuated cylinder is a hydraulic cylinder including a piston and means for supplying and exhausting driving liquid to and from said cylinder.

15. Apparatus according to claim 1, 2 or 3 wherein the fluid actuated cylinder is a hydraulic cylinder including a piston and means for limiting the rotational velocity of the cradle by throttling the flow of liquid from and/or to portions of the cylinder which are respectively ahead of or behind the piston.

16. Apparatus according to claim 1, 2 or 3 wherein the fluid actuated cylinder is a hydraulic cylinder including a piston and wherein said apparatus includes means for causing rolling of the cradle to occur in combination with retraction of the hydraulic cylinder during the prior portion of the dumping motion and causing said rolling to continue at least in part by the action of gravity until the retraction movement of the piston has been completed and reversed to commence extension of said cylinder.

17. Apparatus according to claim 1, 2 or 3 wherein the fluid actuated cylinder is a hydraulic cylinder including a piston and wherein said apparatus includes means for supplying and exhausting driving liquid to and from said cylinder and means for completing the dumping motion by stopping flow of said liquid to said cylinder.

18. Apparatus according to claim 1, 2 or 3 which includes means for maintaining said car stationary in dumping position between said dumping and return motions for a predetermined period of time.

19. Apparatus for receiving and dumping top-unloading railcars comprising:
  A. cradle track extending from a car receiving position to a car dumping position;
  B. a car-receiving cradle movably mounted on said cradle track, said cradle including
    1. car rails for supporting a loaded car on said cradle in a car receiving portion of the assembly,
    2. rocker members with arcuate peripheries for contact with and support by said cradle track, said rocker members comprising
      a. a laterally projecting lower portion, extending beneath said car-receiving portion,
      b. a first side portion that is generally vertical and extends upwardly alongside said car-receiving portion,
      c. an overhanging upper portion overhanging said car-receiving portion, and
      d. a second side portion which
        i) is open at least at or near car coupler height and
        ii) is located on the opposite side of the car-receiving portion relative to said first side portion, and
    3. car clamping means for engaging upper portions of a car and clamping said car in said car-receiving portion of the cradle, including
      a. pivot means connected with and supported by said overhanging upper portions of said rocker members,
      b. power means connected with and supported by said pivot means for pivoting adjustment of the position of the clamping means toward and away from said first side portion and having a power transmitting member for extension and retraction toward and away from the car upper portion, and
      c. a car clamping member suspended from said power means for moving up and down in response to motion of said power transmitting member for clamping and unclamping the car; and
  C. at least one fluid actuated cylinder connected with said cradle for assisting in the movement of said cradle between said car-receiving and car dumping positions, said cradle movement including
    1. a dumping motion having a prior portion in which the cradle rotates through an angular interval in the range of about 70 to about 110 degrees from said car-receiving position, said cylinder applying fluid under pressure for moving said cradle in a subsequent portion of the dumping motion beyond said interval, and
    2. a return motion in which said cylinder applies fluid under pressure for moving said cradle within said interval toward said car-receiving position.

20. Apparatus according to claim 19 wherein the upper portions of the rocker members overhang substantially the entire width of the car-receiving portion.

21. Apparatus according to claim 19 wherein the lower, side and overhanging upper portions define a partial wheel that is generally of crescent shape with an arcuate peripheral surface supported and rollable on said cradle track between said car-receiving and car-dumping positions.

22. Apparatus according to claim 19 wherein the second side portion is open throughout a major portion of the height of the car-receiving portion.

23. Apparatus according to claim 19 wherein the car clamping member is of sufficient width for simultaneously engaging the upper edges of both sides of a railcar and clamping said car in said car-receiving portion of the cradle.

24. Apparatus according to claim 19 wherein the car clamping member is suspended from said power transmitting member for reciprocation with an up and down motion to clamp and unclamp a car.

25. Apparatus according to claim 19 wherein the overhang upper portion of each rocker member includes pivot means supporting hydraulic clamping cylinders from which are suspended the clamping members.

26. Apparatus according to claim 19 wherein the car clamping member, when viewed in the cradle end view with the cradle in car-receiving position, is substantially horizontal, extends generally perpendicular to the car rails and is suspended through a pivotable connection with said power means for relative up and down motion of its opposite ends as it moves into clamping position.

27. Apparatus according to claim 19 including toggle links, each connected by a pivotable connection to one of the clamping members and by another pivotable connection to one of the rocker members, for controlling the lateral positions of the clamping members during raising and lowering thereof.

28. Apparatus according to claim 19 including toggle links, each connected by a pivotable connection to one of the clamping members and by another pivotable connection to one of the rocker members, for maintaining the clamping members generally horizontal as they move into and out of engagement with the top portion of a car.

29. Apparatus according to claim 19 including means for controlling car-clamp reactive forces during inversion of the car by relieving added pressure which has been generated within the power means through exertion of additive forces against the clamping members.

30. Apparatus according to claim 29 wherein said power means are fluid-actuated cylinders and said means for controlling car-clamp reactive forces include means for venting of fluid from the cylinders.

31. Apparatus according to claim 30 wherein said means for venting fluid from the cylinders includes an adjustable pressure relief valve in one or more fluid supply or discharge lines of the cylinders.

* * * * *